United States Patent
Chen et al.

(10) Patent No.: US 8,923,223 B2
(45) Date of Patent: Dec. 30, 2014

(54) PHYSICAL UPLINK CONTROL CHANNEL RESOURCE ALLOCATION FOR MULTIPLE COMPONENT CARRIERS

(75) Inventors: Wanshi Chen, San Diego, CA (US);
Juan Montojo, San Diego, CA (US);
Peter Gaal, San Diego, CA (US);
Xiliang Luo, Northridge, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 13/206,970

(22) Filed: Aug. 10, 2011

(65) Prior Publication Data

US 2012/0039275 A1  Feb. 16, 2012

Related U.S. Application Data

(60) Provisional application No. 61/374,219, filed on Aug. 16, 2010.

(51) Int. Cl.
*H04W 4/00* (2009.01)
*H04L 5/00* (2006.01)
*H04L 1/18* (2006.01)
*H04L 1/16* (2006.01)

(52) U.S. Cl.
CPC ........... *H04L 1/1607* (2013.01); *H04L 5/0094* (2013.01); *H04L 5/0082* (2013.01); *H04L 1/1829* (2013.01); *H04L 5/0023* (2013.01); *H04L 5/001* (2013.01); *H04L 1/1812* (2013.01); *H04L 5/0053* (2013.01)
USPC ......................................................... 370/329

(58) Field of Classification Search
USPC ......... 370/310, 315, 328, 329, 338, 349, 312; 714/748; 455/450
See application file for complete search history.

(56) References Cited

U.S. PATENT DOCUMENTS

2010/0135237 A1* 6/2010 Papasakellariou et al. ... 370/329
2010/0232373 A1* 9/2010 Nory et al. ..................... 370/329

(Continued)

FOREIGN PATENT DOCUMENTS

JP       2008154247 A   7/2008
WO   WO-2010050234 A1   5/2010

(Continued)

OTHER PUBLICATIONS

Interdigital Communications et al: "Cross, Carrier Operation for Bandwidth Extension", 3GPP Draft; R1-093067, 3rd Generation, Partnership Project (3GPP), Mobile, Competence Centre ; 650, Route Des, Lucioles ; F-06921 Sophia-Antipolis Cedex ; France, no. Shenzhen, China; Aug. 19, 2009, XP050351455, [retrieved on Aug. 19, 2009].

(Continued)

*Primary Examiner* — Anh-Vu Ly
*Assistant Examiner* — Gustavo Lopez-Vargas
(74) *Attorney, Agent, or Firm* — Fulbright & Jaworski LLP

(57) ABSTRACT

Techniques for sending control information in a wireless network are disclosed. A multi-carrier user equipment (UE) may receive a downlink grant on a physical downlink control channel (PDCCH) on a first component carrier (CC). The UE may also receive a data transmission associated with the PDCCH on a physical downlink shared channel (PDSCH) on a second CC. In some examples, the UE determines physical uplink control channel (PUCCH) resources for acknowledging the data transmission based on the first CC on which the PDCCH is received, the second CC on which the data transmission is received, and a transmission mode of the second CC. The UE may send acknowledgement/negative acknowledgement (ACK/NACK) information for the data transmission based on the PUCCH resources.

55 Claims, 9 Drawing Sheets

(56) References Cited

U.S. PATENT DOCUMENTS

| | | | |
|---|---|---|---|
| 2010/0232382 A1* | 9/2010 | Gauvreau et al. | 370/329 |
| 2010/0303011 A1* | 12/2010 | Pan et al. | 370/328 |
| 2010/0322158 A1* | 12/2010 | Lee et al. | 370/329 |
| 2011/0002281 A1* | 1/2011 | Terry et al. | 370/329 |
| 2011/0035639 A1* | 2/2011 | Earnshaw et al. | 714/748 |
| 2011/0081932 A1* | 4/2011 | Astely et al. | 455/509 |
| 2011/0176477 A1* | 7/2011 | Lee et al. | 370/315 |
| 2011/0243087 A1* | 10/2011 | Ahn et al. | 370/329 |
| 2011/0243088 A1* | 10/2011 | Ahn et al. | 370/329 |
| 2011/0261776 A1 | 10/2011 | Ahn et al. | |
| 2011/0274066 A1* | 11/2011 | Tee et al. | 370/329 |
| 2011/0305210 A1* | 12/2011 | Wu | 370/329 |
| 2012/0002617 A1* | 1/2012 | Vujcic | 370/329 |
| 2012/0113913 A1* | 5/2012 | Tiirola et al. | 370/329 |
| 2012/0182914 A1* | 7/2012 | Hariharan et al. | 370/311 |
| 2012/0207123 A1* | 8/2012 | Seo et al. | 370/329 |
| 2013/0107852 A1* | 5/2013 | Han et al. | 370/329 |

FOREIGN PATENT DOCUMENTS

| | | |
|---|---|---|
| WO | WO-2010073477 A1 | 7/2010 |
| WO | WO2010114233 A2 | 10/2010 |

OTHER PUBLICATIONS

International Search Report and Written Opinion—PCT/US2011/047329, ISA/EPO—Nov. 2, 2011.

Nokia Siemens Networks et al., "UL control signalling for carrier aggregation", 3GPP Draft; R1-093319, 3rd Generation Partnership Project (3GPP), Mobile Competence Centre ; 650, Route Des Lucioles ; F-06921 Sophia-Antipolis Cedex ; France, no. Shenzhen, China; Aug. 18, 2009, XP050351642, [retrieved on Aug. 18, 2009].

NTT Docomo: "PUCCH Design for Carrier Aggregation in LTE-Advanced", 3GPP Draft; R1-094238 PUCCH, 3rd Generation Partnership Project (3GPP), Mobile Competence Centre ; 650, Route Des Lucioles ; F-06921 Sophia-Anti Polis Cedex ; France, no. Miyazaki; Oct. 12, 2009, XP050388702, [retrieved on Oct. 6, 2009].

Panasonic : "Support of UL ACK/NACK bundling across CCs for carrier aggregation" 3GPP Draft; R1-102857, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; May 10, 2010, May 4, 2010, XP050420007, [retrieved on May 4, 2010].

Qualcomm Incorporated, "Number of Bits Conveyed on Multi-bit-ACK PUCCH Format", 3GPP TSG-RAN WG1 #62 R1-104782, Aug. 27, 2010,URL,http://www.3gpp.org/ftp/TSG_RAN/WG1_RL1/TSGR1_62/Docs/R1-104782.zip.

* cited by examiner

PHYSICAL UPLINK CONTROL CHANNEL RESOURCE ALLOCATION FOR MULTIPLE COMPONENT CARRIERS

The present application claims priority to provisional U.S. Application Ser. No. 61/374,219, entitled "PHYSICAL UPLINK CONTROL CHANNEL (PUCCH) RESOURCE ALLOCATION FOR MULTIPLE COMPONENT CARRIERS," filed Aug. 16, 2010, and incorporated herein by reference in its entirety.

BACKGROUND

I. Field

The present disclosure relates generally to communication and, more specifically, to techniques for supporting communication in a multi-carrier wireless communication system.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple component carriers (CCs). A CC may refer to a range of frequencies used for communication and may be associated with certain characteristics. For example, a CC may be associated with system information describing operation on the CC. A CC may also be referred to as a carrier, a cell, a serving cell, a frequency channel, etc. A base station may send data transmissions on multiple CCs to a UE. The UE may receive and decode the data transmissions, and determine whether each data transmission is decoded correctly or in error.

SUMMARY

Techniques for sending control information in a wireless communication network are disclosed. A UE may be configured for operation on multiple CCs on the downlink and one or more CCs on the uplink. The UE may receive downlink grants on one or more physical downlink control channels (PDCCHs) on one or more of the downlink CCs. The UE may also receive data transmissions associated with the PDCCHs on one or more physical downlink shared channels (PDSCHs) on one or more of the downlink CCs. The UE may determine ACK/NACK information for the received data transmissions and may send the ACK/NACK information on a physical uplink control channel (PUCCH) on an uplink CC.

In one aspect, the UE determines PUCCH resources for sending the ACK/NACK information based on a first CC on which a PDCCH carrying a downlink grant is received and a second CC on which a corresponding data transmission is received. The first CC and the second CC may be a same CC or different CCs and may be identified as being a primary CC (PCC) or a secondary CC (SCC) of the UE that receives the data transmission. The number of PUCCH resources may also be based at least in part on a transmission mode of the second CC.

The UE may determine PUCCH resources in response to a particular transmission scenario. In one aspect, a PDCCH may be sent on the primary CC (PCC) for a data transmission that is also sent on the PCC. The UE may determine PUCCH resources for sending the ACK/NACK information based on a number of a first channel control element (CCE) associated with (e.g., used to send) the PDCCH on the PCC. In another aspect, the PDCCH may be sent on the PCC for a data transmission that is sent on a secondary CC (SCC). The UE may determine PUCCH resources for acknowledging the data transmission based on the number of the first CCE associated with the PDCCH received on the PCC. In still another aspect, the PDCCH may be sent on an SCC of the UE for a data transmission that is also sent on the SCC. The UE may determine PUCCH resources based on PUCCH resources configured for the UE via higher layer signaling. Various additional aspects are described below.

DETAILED DESCRIPTION

The techniques described herein may be used in various wireless communication networks such as CDMA, TDMA, FDMA, OFDMA, SC-FDMA, and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc.

UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used with the wireless networks and radio technologies mentioned above as well as other wireless networks and radio technologies. For clarity, techniques of the present disclosure are described primarily in terms of LTE, and LTE terminology is used in much of the description herein.

Figure 1:
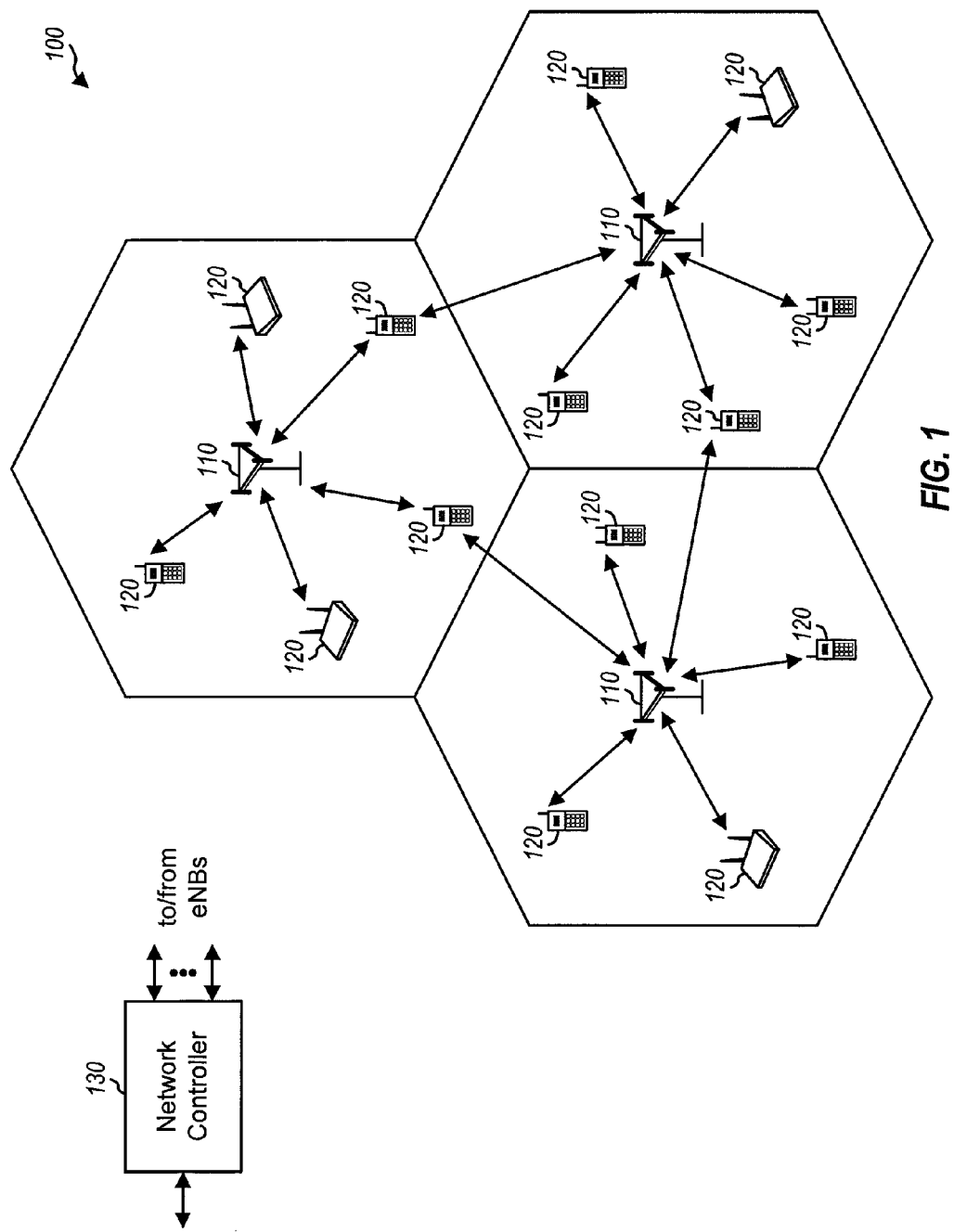
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a Node B, a base station, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. The term "cell" may also refer to a carrier on which an eNB operates.

As shown, a network controller 130 may couple to a set of eNBs and provide coordination and control for these eNBs. Network controller 130 may communicate with the eNBs via a backhaul. The eNBs 110 may also communicate with one another, e.g., directly or indirectly via wireless or wireline backhaul.

UEs 120 may be dispersed throughout wireless network 100. Each UE 120 may be stationary or mobile. A UE may also be referred to herein as a mobile station, a terminal, an access terminal, a subscriber unit, a station, a wireless device, etc. A UE may be a cellular phone, a smart phone, a tablet, a wireless communication device, a personal digital assistant (PDA), a wireless modem, a handheld device, a laptop computer, a cordless phone, a wireless local loop (WLL) station, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency spectrum into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.4, 3, 5, 10 or 20 megahertz (MHz), respectively.

Wireless network 100 may utilize FDD or TDD. For FDD, separate frequency spectrum may be allocated for the downlink and uplink. Downlink transmissions may be sent on one frequency spectrum, and uplink transmissions may be sent on another frequency spectrum. For TDD, the downlink and uplink may share the same frequency spectrum, and downlink and uplink transmissions may be sent on the same frequency spectrum in different time intervals.

Figure 2:
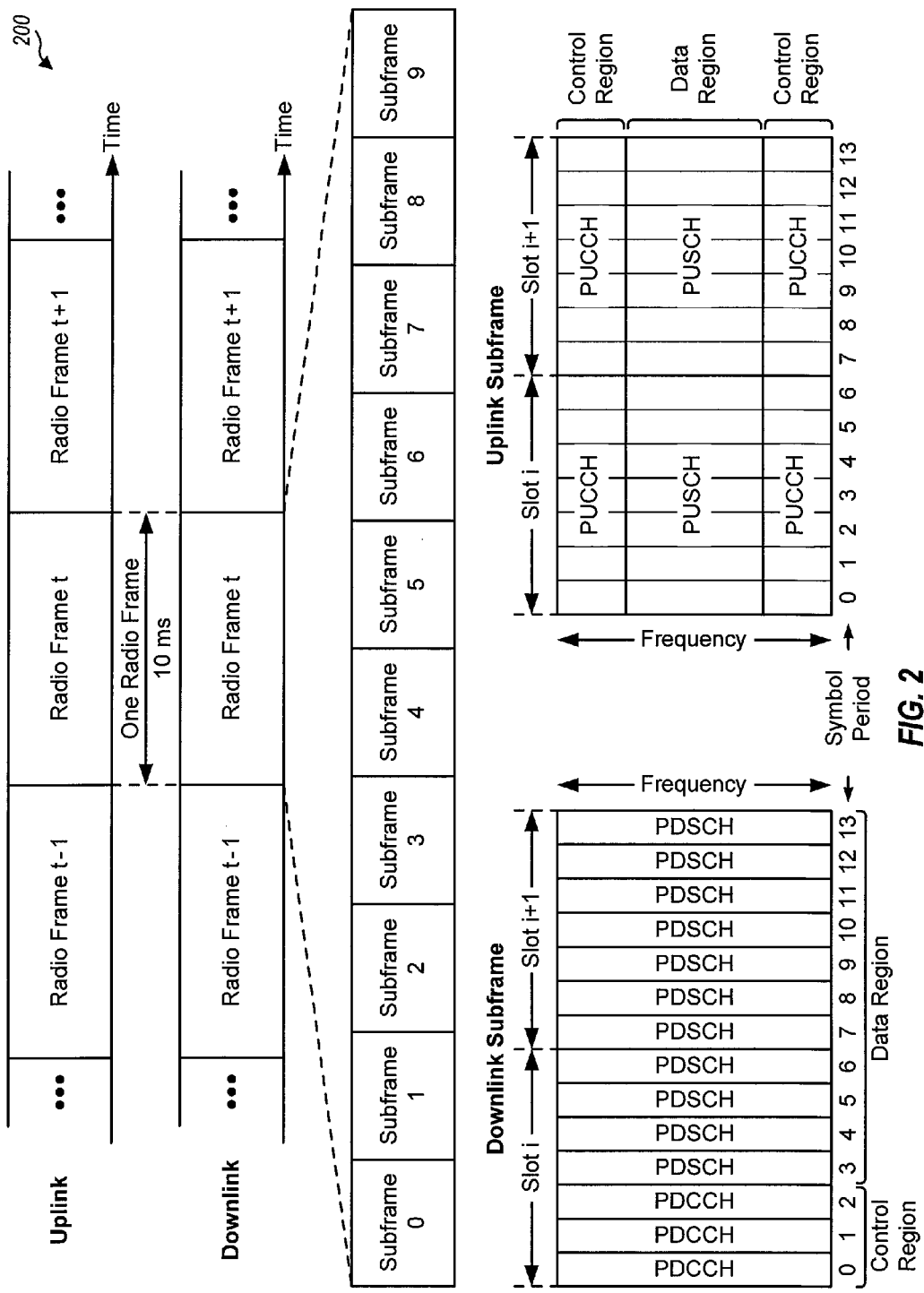
FIG. 2 shows an exemplary frame structure.

FIG. 2 shows an exemplary frame structure 200 for FDD in an LTE system. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1. The available time frequency resources for each of the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

A subframe for the downlink (i.e., a downlink subframe) may include a control region and a data region, which may be time division multiplexed (TDM) as shown in FIG. 2. The control region may include the first Q symbol periods of the subframe, where Q may be equal to 1, 2, 3 or 4. Q may change from subframe to subframe and may be conveyed in the first symbol period of the subframe. The data region may include the remaining 2L-Q symbol periods of the subframe. An eNB may send downlink control information (DCI) on a physical downlink control channel (PDCCH) in the control region to a UE. The DCI may include a downlink grant, an uplink grant, power control information, etc. The eNB may send data and/or other information on a physical downlink shared channel (PDSCH) in the data region to the UE.

A subframe for the uplink (i.e., an uplink subframe) may include a control region and a data region, which may be frequency division multiplexed (FDM) as shown in FIG. 2. The control region may include resource blocks near the two edges of the uplink spectrum (as shown in FIG. 2) and may have a configurable size. The data region may include all resource blocks not included in the control region. A UE may send uplink control information (UCI) on a physical uplink control channel (PUCCH) in the control region to an eNB. The UCI may include ACK/NACK information for data transmission sent on the downlink, channel quality indicator (CQI) information, scheduling request, etc. The UE may send only data or both data and UCI on a physical uplink shared channel (PUSCH) in the data region to the eNB. An uplink transmission on the PUCCH or PUSCH may span both slots of a subframe and may hop across frequency.

Wireless network 100 may support multi-carrier operation with multiple CCs on the downlink and one or more CCs on the uplink. Operation on multiple CCs may be referred to as carrier aggregation (CA). A CC for the downlink may be referred to as a downlink CC, and a CC for the uplink may be referred to as an uplink CC. An eNB may transmit data and/or DCI on one or more downlink CCs to a UE. The UE may transmit data and/or UCI on one or more uplink CCs to the eNB.

Wireless network 100 may support data transmission with hybrid automatic retransmission (HARQ) in order to improve reliability. For HARQ, a transmitter (e.g., an eNB) may send an initial transmission of a transport block and may send one or more additional transmissions of the transport block, if needed, until the transport block is decoded correctly by a receiver, or the maximum number of transmissions of the transport block has occurred, or some other termination condition is encountered. After each transmission of the transport block, the receiver may decode all received transmissions of the transport block to attempt to recover the transport block. The receiver may send an acknowledgement (ACK) if the transport block is decoded correctly, a negative acknowledgement (NACK) if the transport block is decoded in error, or a discontinuous transmission (DTX) if the transport block is missed. The transmitter may send another transmission of the transport block if a NACK or a DTX is received and may terminate transmission of the transport block if an ACK is received. A transport block may also be referred to as a packet, a codeword, a data block, etc. A data transmission may comprise one or more transport blocks.

Figure 3:
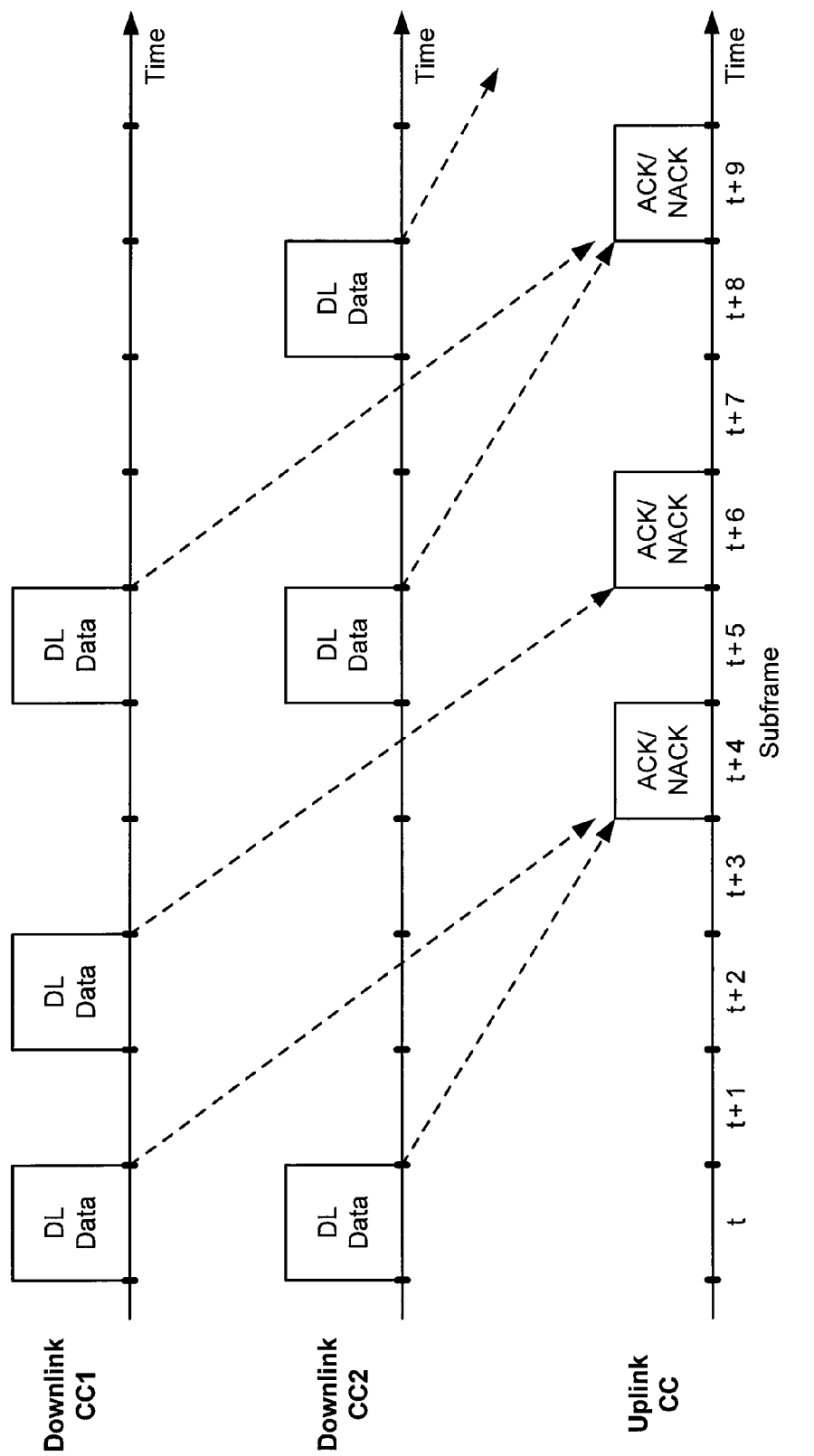
FIG. 3 shows an exemplary data transmission on two CCs with HARQ.

FIG. 3 shows data transmission on two downlink CCs with HARQ. A UE may periodically estimate the downlink channel quality of different downlink CCs for an eNB and may send CQI to the eNB (not shown in FIG. 3). The eNB may use the CQI and/or other information to select the UE for data transmission on the downlink, to schedule the UE on one or more downlink CCs, and to select one or more modulation and coding schemes (MCSs) for the UE for each scheduled CC. The eNB may process (e.g., encode and modulate) one or more transport blocks for each scheduled CC based on the MCS(s) selected for that CC. The eNB may send a data transmission of one or more transport blocks on each scheduled CC to the UE in subframe t.

The UE may receive and decode the data transmission on each scheduled CC. The UE may determine whether each transport block is decoded correctly or in error. For each transport block, the UE may obtain an ACK if the transport block is decoded correctly or a NACK if the transport block is decoded in error. The UE may send ACK/NACK information comprising the ACKs and/or NACKs for all transport blocks in subframe t+D. The ACK/NACK information may also be referred to as HARQ feedback, ACK/NACK, etc. D is a HARQ feedback delay and may be equal to four (as shown in FIG. 3) or some other value. The eNB may receive the ACK/NACK information from the UE, terminate transmission of each transport block for which an ACK is received, and send another transmission of each transport block for which a NACK is received.

In the present example, the UE may receive data transmission on any number of downlink CCs in a subframe. Furthermore, the UE may receive a data transmission of one or more transport blocks on each scheduled CC. In one design, the UE may send ACK/NACK information for all transport blocks received on all downlink CCs in one ACK/NACK transmission on one uplink CC, as shown in FIG. 3. More generally, a UE may be configured with any number of downlink CCs and any number of uplink CCs for multi-carrier operation. In some systems, one downlink CC may be designated as a downlink primary CC (PCC), one uplink CC may be designated as an uplink PCC, and each remaining CC may be referred to as a secondary CC (SCC). An eNB may send certain information (e.g., downlink grants, uplink grants, and/or ACK/NACK) to the UE on the downlink PCC. The UE may send certain information (e.g., ACK/NACK) on the uplink PCC to the eNB.

Figure 4A:
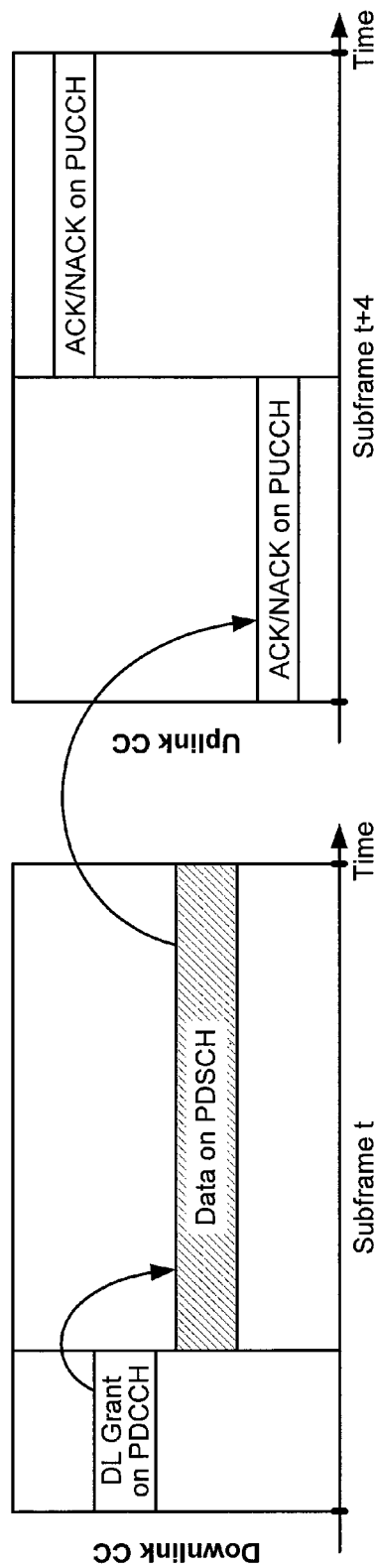
FIG. 4A shows an exemplary data transmission on one CC.

FIG. 4A shows an example of data transmission on one downlink CC for single-carrier operation. An eNB may send a downlink (DL) grant on the PDCCH in the control region of subframe t to a UE. The downlink grant may comprise various parameters for a data transmission from the eNB to the UE. The eNB may send the data transmission to the UE on PDSCH in the data region of subframe t. The UE may receive and process the data transmission and, in the present example, may send ACK/NACK information on the PUCCH in the control region of subframe t+4.

Figure 4B:
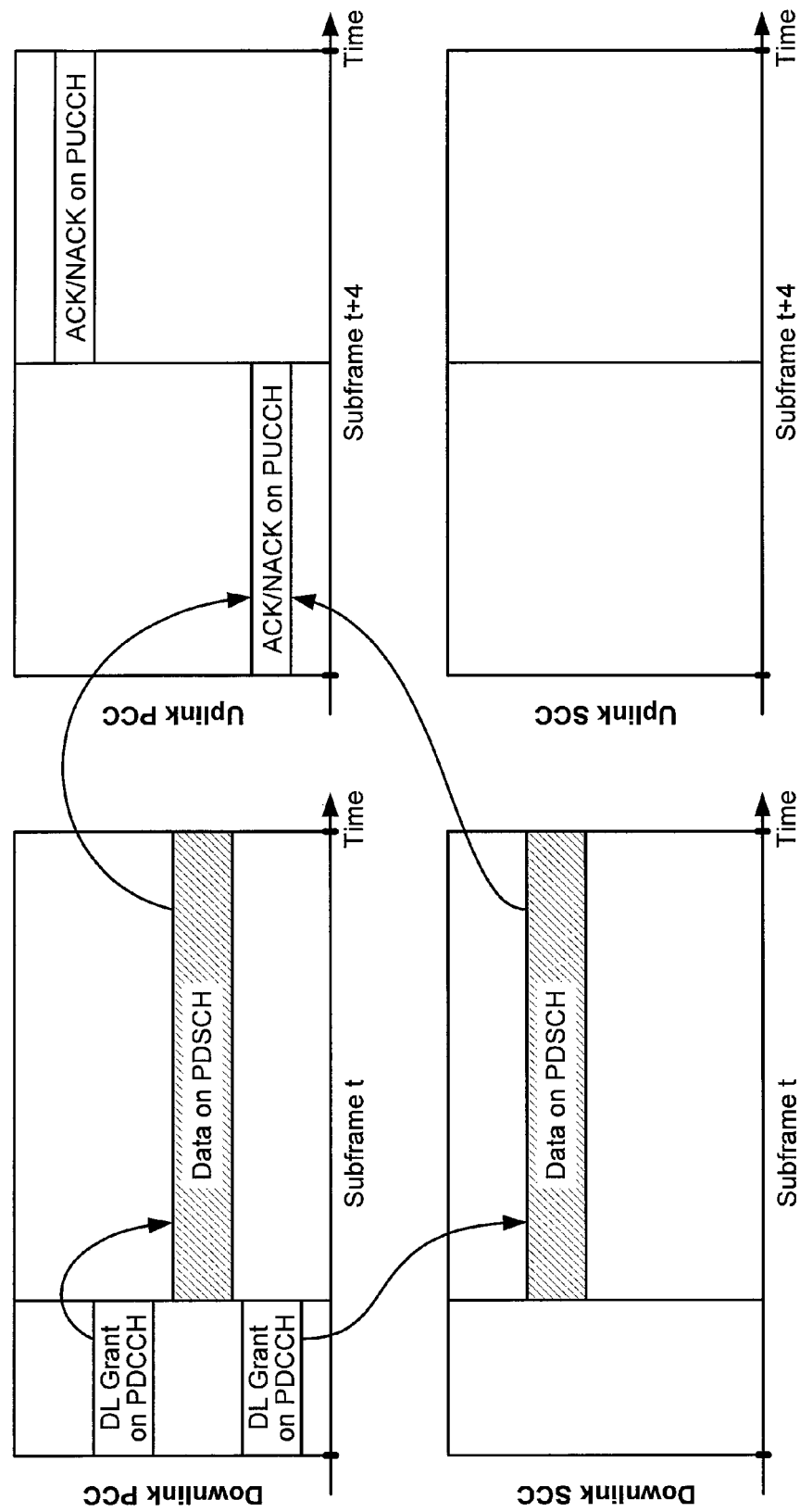
FIGS. 4B and 4C show exemplary data transmissions on two CCs with cross-carrier scheduling and same-carrier scheduling, respectively.

FIG. 4B shows an example of data transmission on two downlink CCs for multi-carrier operation with cross-carrier scheduling. In this example, a UE may be configured for multi-carrier operation on (i) two downlink CCs including a downlink PCC and a downlink SCC, and (ii) two uplink CCs including an uplink PCC and an uplink SCC. In subframe t, an eNB may send a first downlink grant on a first PDCCH and a second downlink grant on a second PDCCH on the downlink PCC to the UE. The first downlink grant may comprise various parameters for a first data transmission on the downlink PCC. The second downlink grant may comprise various parameters for a second data transmission on the downlink SCC. The second downlink grant may include a carrier indication field (CIF) indicating a specific CC on which the associated data transmission is sent. The eNB may send the first data transmission on the PDSCH on the downlink PCC and the second data transmission on the PDSCH on the downlink SCC in subframe t to the UE. The UE may receive and process the first and second data transmissions and may send ACK/NACK information for both data transmissions on the PUCCH on the uplink PCC in subframe t+4.

Figure 4C:
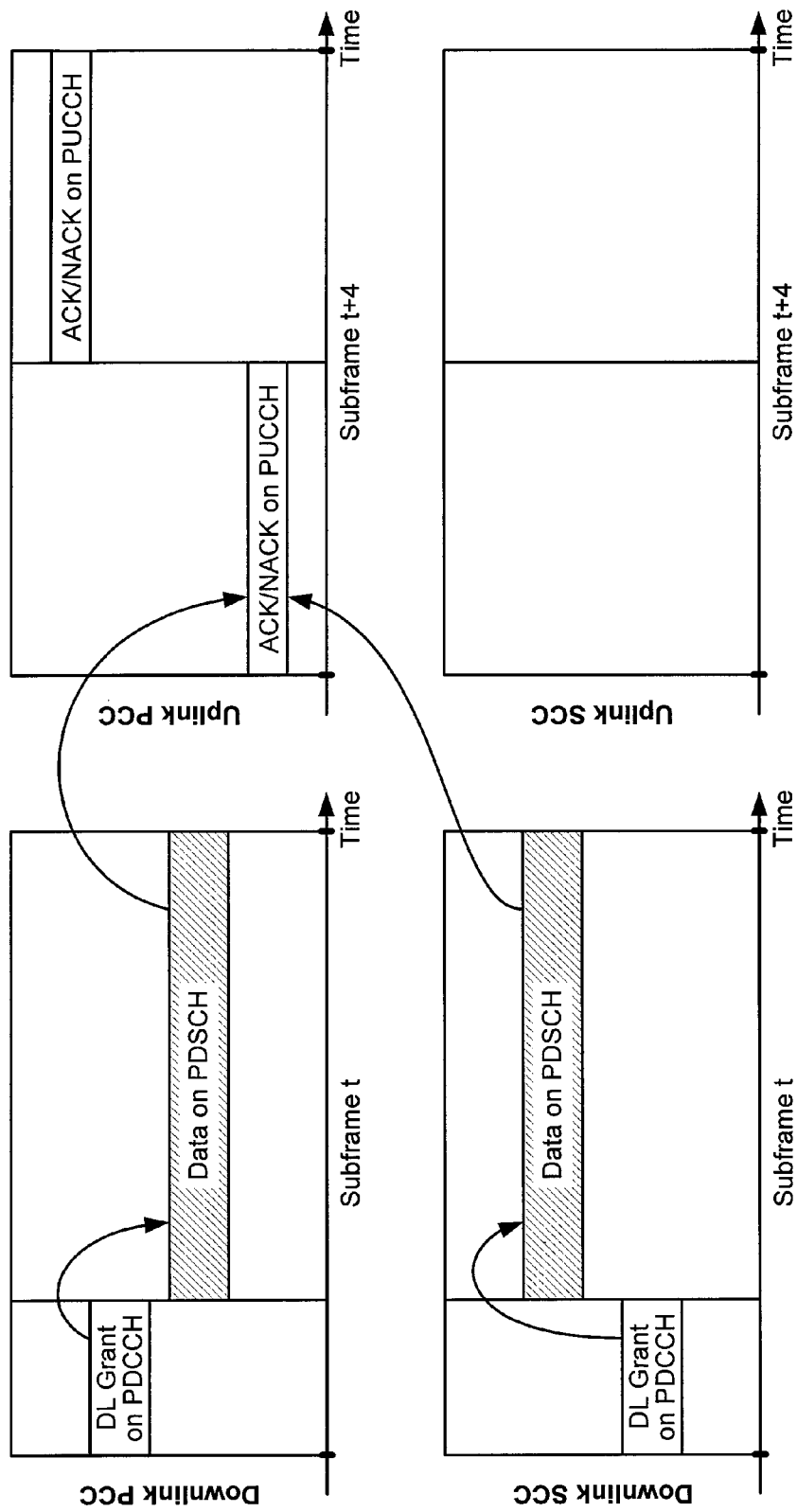

FIG. 4C shows an example of data transmission on two downlink CCs for multi-carrier operation without cross-carrier scheduling. In this example, an eNB may send a first downlink grant on a first PDCCH on a downlink PCC to a UE. The first downlink grant may be sent in subframe t. The eNB may also send a second downlink grant in subframe t on a second PDCCH on a downlink SCC. The first downlink grant may comprise various parameters for a first data transmission on the downlink PCC. The second downlink grant may comprise various parameters for a second data transmission on the downlink SCC. The eNB may send the first data transmission on the PDSCH on the downlink PCC and the second data transmission on the PDSCH on the downlink SCC in subframe t to the UE. The UE may receive and process the first and second data transmissions and may send ACK/NACK information for both data transmissions on the PUCCH on the uplink PCC in subframe t+4.

FIGS. 4A-4C show data transmission with dynamic scheduling. For a dynamically scheduled data transmission, a downlink grant may be sent on the PDCCH to schedule data transmission on the PDSCH on a particular downlink CC. Data transmission with semi-persistent scheduling (SPS) may also be supported. For SPS, a UE may be semi-statically configured with parameters for data transmissions on a downlink CC, such that each data transmission occurs without sending a downlink grant on the PDCCH. In one example, SPS may be supported only on the downlink PCC. In another example, SPS may be supported on any downlink CC.

A UE may send ACK/NACK information for a downlink data transmission based on PUCCH resources. A PUCCH resource may comprise time-frequency resources (e.g., one or more resource blocks), a reference signal sequence (e.g., a specific cyclic shift of a Zadoff-Chu sequence), an orthogonal sequence (e.g., a specific Walsh sequence or DFT sequence), or a combination of these and other resources. The manner in which the PUCCH resources used for sending ACK/NACK information are determined may vary.

For single-carrier operation, a downlink grant for a data transmission on a downlink CC may be sent on the PDCCH in 1, 2, 4 or 8 control channel elements (CCEs). Each CCE may include nine resource element groups, and each resource element group may include four resource elements. ACK/NACK information for the data transmission associated with the PDCCH may be sent on a PUCCH resource, which may be determined as follows:

$$n_{PUCCH}^{(1)} = n_{CCE} + N_{PUCCH}^{(1)}, \qquad \text{Eq (1)}$$

where
$n_{CCE}$ is a number of the first CCE used to send the PDCCH carrying the downlink grant, $n_{PUCCH}^{(1)}$ is an index of the PUCCH resource to use to send ACK/NACK information, and $N_{PUCCH}^{(1)}$ is a parameter configured by higher layer, e.g., Radio Resource Control (RRC).

The number of the first CCE, $n_{CCE}$, may correspond to the lowest index of all CCEs used to send the PDCCH carrying the downlink grant. ACK/NACK information for a data transmission sent without a PDCCH (e.g., a semi-persistently scheduled data transmission) may be sent on a PUCCH resource determined based on a higher layer configuration.

For multi-carrier operation, ACK/NACK information for multiple data transmissions on multiple downlink CCs may be sent on the PUCCH on one uplink CC, as shown in FIGS. 4B-4C. This single uplink CC may be configured semi-statically for a given UE and used to send ACK/NACK information on the PUCCH. The UE-specific uplink CC may be the uplink PCC for the UE. In one example, a PUCCH resource to use for sending ACK/NACK information for a data transmission on the downlink PCC is determined as follows:

$$n_{PUCCH,PCC}^{(1)} = n_{CCE,PCC} + N_{PUCCH}^{(1)}, \quad \text{Eq (2)}$$

where $n_{CCE,PCC}$ is a number of the first CCE used to send the PDCCH carrying a downlink grant on the downlink PCC, and $n_{PUCCH,PCC}^{(1)}$ is an index of the PUCCH resource to use to send ACK/NACK information for the data transmission on the downlink PCC.

As shown in equations (1) and (2), a PUCCH resource to use to send ACK/NACK information for a data transmission scheduled via a downlink grant sent on the PUCCH on the downlink PCC may be determined in a similar manner as for the case of downlink data transmission in single-carrier operation. The PUCCH resource on the uplink PCC may be implicitly mapped to PDCCH resource(s) (e.g., the first CCE of the PDCCH) on the downlink PCC. This implicit mapping may avoid overhead to send signaling to convey the PUCCH resource.

In general, one or multiple transport blocks may be sent on each downlink CC in a given subframe. For example, one transport block may be sent on a downlink CC that is configured for single-input single-output (SISO) or single-input multiple-output (SIMO), as supported by transmission modes 1, 2, 5, 6 and 7 in LTE Release 9. One or two transport blocks may be sent on a downlink CC that is configured for multiple-input multiple-output (MIMO), as supported by transmission modes 3, 4 and 8 in LTE Release 9.

In one aspect, a UE may be scheduled for data transmission on up to two downlink CCs, and up to two transport blocks may be sent on each scheduled CC. In this situation, up to four transport blocks may be sent to the UE on up to two downlink CCs in a given subframe. Up to four bits of ACK/NACK information may therefore be generated to acknowledge receipt of the transport blocks in the subframe. When data transmission is scheduled on only one downlink CC (e.g., the downlink PCC) in a given subframe, up to two transport blocks may be sent to the UE on the downlink CC, and up to two bits of ACK/NACK information may be generated for acknowledging the transport block(s).

In one aspect, ACK/NACK information for multiple data transmissions on multiple downlink CCs may be sent based on a predetermined PUCCH format and channel selection. The predetermined PUCCH format may be PUCCH format 1b in LTE, which supports transmission of two bits of information on the PUCCH on one pair of resource blocks in one subframe. With channel selection, multiple PUCCH resources may be available for use by a UE, and one PUCCH resource may be selected for use. Two bits of information/signaling may be sent on the selected PUCCH resource to convey the ACK/NACK information. In particular, the ACK/NACK information may be mapped to the specific PUCCH resource used to send the information/signaling as well as the actual information/signaling sent on the PUCCH resource. Channel selection may allow a UE to send a PUCCH transmission comprising ACK/NACK information on one PUCCH resource, which may enable the UE to maintain a single-carrier waveform having a lower peak-to-average-power ratio (PAPR).

Channel selection may be implemented in various manners. In one example, one or more bits of ACK/NACK information may be used to select one of the available PUCCH resources, and one or more remaining bits of the ACK/NACK information may be sent on the selected PUCCH resource. In another example, a mapping table may be defined to indicate specific information/signaling to send and a specific PUCCH resource to use to send the information/signaling for each possible set of values of ACK/NACK information. Channel selection may also be implemented in other manners.

PUCCH resources available to a UE for sending ACK/NACK information in connection with a data transmission on one or more downlink CCs may be determined in various manners. In one example, the available PUCCH resources may be determined based on whether the data transmission is dynamically scheduled via one or more downlink grants, or semi-statically scheduled via SPS. In one example, for a dynamically scheduled data transmission, the available PUCCH resources may be dependent on the particular downlink CC used to send the PDCCH carrying a downlink grant for a scheduled CC.

In one aspect, for a dynamically scheduled data transmission on the downlink PCC with a PDCCH that is sent on the downlink PCC, the UE may determine one or more available PUCCH resources based on the first CCE used to send the PDCCH. When two transport blocks are sent on the downlink PCC, two available PUCCH resources may be determined based on the first CCE of the PDCCH, as follows:

$$n_{PUCCH,PCC,i}^{(1)} = n_{CCE,PCC} + N_{PUCCH}^{(1)}, \text{ and} \quad \text{Eq (3)}$$

$$n_{PUCCH,PCC,i+1}^{(1)} = n_{CCE,PCC} + 130\ N_{PUCCH}^{(1)}, \quad \text{Eq (4)}$$

where $n_{PUCCH,PCC,i}^{(1)}$ and $n_{PUCCH,PCC,i+1}^{(1)}$ are indices of two available PUCCH resources dynamically linked to the PDCCH sent on the downlink PCC. As shown in equation (3), the UE may determine one available PUCCH resource based on the first CCE of the PDCCH when one transport block is sent on the downlink PCC.

In one aspect, for a dynamically scheduled data transmission on the downlink SCC that is based on the PDCCH sent on the downlink PCC (e.g., with CIF used for cross-carrier scheduling), one or more available PUCCH resources may be determined based on the first CCE used to send the PDCCH. When two transport blocks are sent on the downlink SCC, two available PUCCH resources may be determined based on the first CCE of the PDCCH, as follows:

$$n_{PUCCH,SCC,i}^{(1)} n_{CCE,SCC} + N_{PUCCH}^{(1)}, \quad \text{Eq (5)}$$

and $$n_{PUCCH,SCC,i+1}^{(1)} + n_{CCE,SCC} + 1 + N_{PUCCH}^{(1)}, \quad \text{Eq (6)}$$

where $n_{PUCCH,SCC,i}^{(1)}$ and $n_{PUCCH,SCC,i+1}^{(1)}$ are indices of two available PUCCH resources dynamically linked to the PDCCH sent on the downlink SCC. As shown in equation (5), the UE may determine one available PUCCH resource based on the first CCE of the PDCCH when one transport block is sent on the downlink SCC.

According to the examples in equations (3) to (6), four PUCCH resources may be available for a combination of (i) a first data transmission of two transport blocks on the downlink PCC scheduled by a first PDCCH that is sent on the downlink PCC and (ii) a second data transmission of two transport blocks on the downlink SCC scheduled by a second PDCCH that is sent on the downlink PCC, e.g., as shown in FIG. 4B. The subscript "PCC" and "SCC" in equations (3) to (6) refer to the CC on which a data transmission is sent (and not the CC on which a PDCCH is sent).

Also, as shown by equations (3) and (4), two consecutive PUCCH resources may be determined based on two consecutive numbers $n_{CCE,PCC}$ and $n_{CCE,PCC}+1$ of the first two CCEs of the PDCCH carrying a downlink grant for a data transmission on the downlink PCC. As shown by equations (5) and (6), two consecutive PUCCH resources may be determined based on two consecutive numbers $n_{CCE,PCC}$ and $n_{CCE,PCC}+1$ of the first two CCEs of the PDCCH carrying a downlink grant for a data transmission on the downlink SCC. In one example, the PDCCH carrying a downlink grant may be sent in at least two CCEs, which may ensure that the two PUCCH resources linked to the first two CCEs will not be assigned to another UE. In another example, the PDCCH carrying a downlink grant may be sent in one CCE, and the UE may avoid using the next CCE as the first CCE for another PDCCH carrying another downlink grant. This design may avoid collision between multiple UEs on the same PUCCH resource.

For a dynamically scheduled data transmission on the downlink SCC based on the PDCCH sent on the downlink SCC (e.g., without using CIF), one or more available PUCCH resources may be determined based on PUCCH resources configured for a UE via higher layer (e.g., RRC) signaling. For example, one or more PUCCH resources may be semi-statically configured for the UE via higher layer signaling, e.g., one configured PUCCH resource for each transport block. In another example, one or more sets of PUCCH resources may be semi-statically configured for the UE via higher layer signaling, e.g., one set of PUCCH resources for each transport block. In this case, one PUCCH resource in each set may be selected based on control information included in a downlink grant sent on the PDCCH on the downlink SCC, and each set may include two, three, four, or some other number of PUCCH resources.

For a SPS data transmission on the downlink PCC, the UE may determine one or more available PUCCH resources based on PUCCH resources configured via higher layer signaling. In one example, two consecutive PUCCH resources are semi-statically configured for the UE via higher layer signaling. These resources may be denoted as $n_{PUCCH,i}^{(1)}$ and $n_{PUCCH,i}^{(1)}+1$. In another example, one or more sets of consecutive or non-consecutive PUCCH resources may be semi-statically configured for the UE via higher layer signaling. The UE may select one or more PUCCH resources for use from among the configured PUCCH resources which may be indicated at activation of SPS, deactivation of SPS, and/or some other time. In still another example, the UE may determine one or more available PUCCH resources based on an SPS message sent on the PDCCH on a downlink CC. For example, the message may activate SPS, deactivate SPS, change SPS, etc. The PUCCH resource(s) may be determined based on the first CCE of the PDCCH carrying the message.

Table 1 shows information for determining available PUCCH resources which includes the cases described above. For case 1, data may be sent on the downlink PCC based on a downlink grant/PDCCH sent on the downlink PCC. PUCCH resources for sending ACK/NACK information may be determined based on the first CCE of the PDCCH carrying the downlink grant, e.g., as shown in equation (2) or both equations (3) and (4). For case 2, data may be sent on the downlink PCC and SCC based on two downlink grants/PDCCHs sent on the downlink PCC, e.g., as shown in FIG. 4B. PUCCH resources may be determined based on the first CCEs of the two PDCCHs carrying the two downlink grants, e.g., as shown in equations (3) to (6). For case 3, data may be sent on the downlink PCC and SCC based on a first downlink grant/PDCCH sent on the downlink PCC and a second downlink grant/PDCCH sent on the downlink SCC, e.g., as shown in FIG. 4C. PUCCH resources may be determined based on the first CCE of the PDCCH carrying the first downlink grant and PUCCH resources configured for the UE. For case 4, data may be sent on the downlink PCC without any downlink grant using semi-persistent scheduling and PUCCH resources may be determined based on PUCCH resources configured for the UE.

TABLE 1

| | | | PUCCH Resources |
|---|---|---|---|
| Case | PDCCH/DL grant sent on . . . | Data sent on . . . | PUCCH resources determined by . . . |
| 1 | DL grant sent on PCC | PCC | PUCCH resources determined by first CCE of PDCCH carrying DL grant |
| 2 | 1st DL grant sent on PCC | PCC | PUCCH resources determined by first CCE of PDCCH carrying 1st DL grant |
| | 2nd DL grant sent on PCC (with CIF) | SCC | PUCCH resources determined by first CCE of PDCCH carrying 2nd DL grant |
| 3 | 1st DL grant sent on PCC | PCC | PUCCH resources determined by first CCE of PDCCH carrying 1st DL grant |
| | 2nd DL grant sent on SCC (without CIF) | SCC | PUCCH resources configured for UE via higher layer signaling |
| 4 | no DL grant sent on PCC | PCC | PUCCH resources configured for UE via higher layer signaling |

Table 1 shows a design of determining the available PUCCH resources based on (i) whether a data transmission is dynamically scheduled or semi-statically scheduled, (ii) the particular downlink CC on which a downlink grant/PDCCH is sent, and (iii) the particular downlink CC on which the data transmission is sent. A UE may be able to determine which downlink CCs are scheduled (e.g., versus configured or activated) and the manner in which each downlink CC is scheduled (e.g., dynamically or semi-persistently). The available PUCCH resources may also be determined in other manners.

In general, the available PUCCH resources for a data transmission on a given downlink CC may be dynamically linked to the first CCE of the PDCCH carrying a downlink grant, or determined based on PUCCH resources configured by higher layer, or ascertained in other manners. Data transmissions on different downlink CCs may be associated with PUCCH resources determined in the same manner (e.g., for case 2 in Table 1) or in different manners (e.g., for case 3 in Table 1).

Any number of PUCCH resources may be used to send ACK/NACK information with channel selection. In a first example of channel selection, one PUCCH resource may be used to send two bits of ACK/NACK information, two PUCCH resources may be used to send three bits of ACK/NACK information, and four PUCCH resources may be used to send four bits of ACK/NACK information. In a second example of channel selection, two PUCCH resources may be used to send two bits of ACK/NACK information, three PUCCH resources may be used to send three bits of ACK/NACK information, and four PUCCH resources may be used to send four bits of ACK/NACK information. Fewer or more PUCCH resources may also be used to send ACK/NACK information. For clarity, several exemplary designs of sending ACK/NACK information with channel selection are described below.

Table 2 shows a design for determining PUCCH resources with a data transmission on one downlink PCC and with ACK/NACK transmission on an uplink PCC. Four scenarios are shown. One transport block (TB) may be sent on a downlink CC based on transmission mode 1, 2, 5, 6 or 7 in LTE Release 9. Two transport blocks may be sent on a downlink CC based on transmission mode 3, 4 or 8 in LTE Release 9. Additional transmission modes may also be defined. As shown in Table 2, PUCCH format 1a may be used to send one bit of ACK/NACK information based on one PUCCH resource, and PUCCH format 1b may be used to send two bits of ACK/NACK information based on one PUCCH resource. The PUCCH resource may be determined based on the first CCE of the PDCCH carrying a downlink grant or PUCCH resources configured for a UE via higher layer signaling.

TABLE 2

Data Transmission on One Downlink CC

| PCC TX Mode | SCC TX Mode | ACK/NACK Trans | # bits ACK/NACK | PUCCH Resources |
| --- | --- | --- | --- | --- |
| Single TB {1, 2, 5, 6, 7} | Not scheduled | PUCCH format 1a | 1 | PUCCH resource dynamically linked to first CCE on PCC |
| Not scheduled | Single TB {1, 2, 5, 6, 7} | PUCCH format 1a | 1 | If CIF is used for SCC scheduling PUCCH resource dynamically linked to first CCE on PCC Else configured PUCCH resource |
| Two TBs {3, 4, 8} | Not scheduled | PUCCH format 1b | 2 | PUCCH resource dynamically linked to first CCE on PCC |
| Not scheduled | Two TBs {3, 4, 8} | PUCCH format 1b | 2 | If CIF is used for SCC scheduling PUCCH resource dynamically linked to first CCE on PCC Else configured PUCCH resource |

Table 3 shows a design for determining PUCCH resources for a data transmission on two downlink PCCs and ACK/NACK transmission on an uplink PCC. As shown, PUCCH format 1b may be used to send two bits of ACK/NACK information based on one PUCCH resource. PUCCH format 1b with channel selection may be used to send three bits of ACK/NACK information based on two PUCCH resources. PUCCH format 1b with channel selection may be used to send four bits of ACK/NACK information based on four PUCCH resources. The available PUCCH resources may be determined based on the first CCE of the PDCCH carrying a downlink grant and/or PUCCH resources configured for a UE via higher layer signaling.

TABLE 3

Data Transmission on Two Downlink CCs

| PCC TX Mode | SCC TX Mode | ACK/NACK Trans | # bits ACK/NACK | PUCCH Resources |
| --- | --- | --- | --- | --- |
| Single TB | Single TB | PUCCH format 1b | 2 | PUCCH resource dynamically linked to first CCE of 1st PDCCH on PCC |
| Single TB | Two TBs | PUCCH format 1b w/ channel selection | 3 | PUCCH resource dynamically linked to first CCE of 1st PDCCH on PCC + additional PUCCH resource for channel selection If CIF is used for SCC scheduling additional PUCCH resource is dynamically linked to first CCE of 2nd PDCCH on PCC Else configured PUCCH resource |

TABLE 3-continued

Data Transmission on Two Downlink CCs

| PCC TX Mode | SCC TX Mode | ACK/ NACK Trans | # bits ACK/ NACK | PUCCH Resources |
|---|---|---|---|---|
| Two TBs | Single TB | PUCCH format 1b w/ channel selection | 3 | PUCCH resource dynamically linked to first CCE of 1st PDCCH on PCC + additional PUCCH resource for channel selection If CIF is used for SCC scheduling additional PUCCH resource is dynamically linked to first CCE of 2nd PDCCH on PCC Else configured PUCCH resource |
| Two TBs | Two TBs | PUCCH format 1b w/ channel selection | 4 | Two PUCCH resources dynamically linked to first CCE of 1st PDCCH on PCC + two additional PUCCH resources for channel selection If CIF is used for SCC scheduling additional PUCCH resources are dynamically linked to first CCE of 2nd PDCCH on PCC Else configured PUCCH resources |

Table 4 shows a further design of determining PUCCH resources for a data transmission on two downlink PCCs and ACK/NACK transmission on the uplink PCC. As shown, Table 4 provide a different determination of available PUCCH resources in the four scenarios identified in Table 3.

TABLE 4

Data Transmission on Two Downlink CCs

| PCC TX Mode | SCC TX Mode | ACK/ NACK Trans | # bits ACK/ NACK | PUCCH Resources |
|---|---|---|---|---|
| Single TB | Single TB | PUCCH format 1b | 2 | PUCCH resource dynamically linked to first CCE of 1st PDCCH on PCC |
| Single TB | Two TBs | PUCCH format 1b w/ channel selection | 3 | PUCCH resource dynamically linked to first CCE of 1st PDCCH on PCC + additional PUCCH resource for channel selection If CIF is used for SCC scheduling additional PUCCH resource is dynamically linked to first CCE of 2nd PDCCH on PCC Else additional PUCCH resource is determined based on $n_{CCE,PCC} + 1$ |
| Two TBs | Single TB | PUCCH format 1b w/ channel selection | 3 | PUCCH resource dynamically linked to first CCE of 1st PDCCH on PCC + additional PUCCH resource for channel selection If CIF is used for SCC scheduling additional PUCCH resource is dynamically linked to first CCE of 2nd PDCCH on PCC Else additional PUCCH resource is determined based on $n_{CCE,PCC} + 1$ |
| Two TBs | Two TBs | PUCCH format 1b w/ channel selection | 4 | Two PUCCH resources dynamically linked to first CCE of 1st PDCCH on PCC ($n_{CCE,PCC}$ and $n_{CCE,PCC} + 1$) + two additional PUCCH resources for channel selection If CIF is used for SCC scheduling additional PUCCH resources are dynamically linked to first CCE of 2nd PDCCH on PCC ($n_{CCE,SCC}$ and $n_{CCE,SCC} + 1$) Else configured PUCCH resources |

Tables 2 to 4 show exemplary designs for determining PUCCH resources in different data transmission and ACK/NACK transmission scenarios. Further examples of data transmission and ACK/NACK transmission are possible within the scope of the present disclosure and the foregoing design principles may be extended to cover them. For example, a different number of PUCCH resources may be used for a given scenario, the available PUCCH resource(s) may be determined in other manners, or a different ACK/NACK transmission may be used for a given scenario.

In the examples given above, up to four bits of ACK/NACK information may be sent based on PUCCH format 1b and channel selection. These examples focus on data transmission involving up to two downlink CCs. A UE may be configured with more than two downlink CCs (e.g., with up to five downlink CCs for multi-carrier operation in LTE-A) and scheduled for data transmission on up to two configured downlink CCs in a given subframe. The UE may determine which downlink CC(s) are scheduled in the subframe and may send ACK/NACK information based on the designs described above. Alternatively, the UE may be scheduled for data transmission on more than two configured downlink CCs in a given subframe. In this case, the UE may utilize PUCCH format 3 to send more than four bits of ACK/NACK information. PUCCH format 3 utilizes discrete Fourier transform-spread OFDM (DFT-S-OFDM). For PUCCH format 3, the UE may transform L bits of ACK/NACK information to the frequency domain based on a DFT, map the resultant frequency-domain symbols to resource elements in one or more resource blocks for ACK/NACK transmission, and generate SC-FDMA symbols based on the mapped symbols.

The examples above do not require ACK/NACK bundling, and may support signaling of ACK, NACK, and DTX feedback for each transport block. Spatial bundling and/or CC bundling may also be used in combination with the foregoing designs to reduce the number of bits of ACK/NACK information to send. For spatial bundling of multiple transport blocks received on a given CC, an ACK or a NACK may be determined for each transport block received on the CC. A bundled ACK may then be sent if ACKs are obtained for all transport blocks, and a bundled NACK may be sent if a NACK is obtained for any transport block. With spatial bundling, up to two bits of ACK/NACK information may be sent for data transmission on up to two downlink CCs, one bit to indicate a bundled ACK or a bundled NACK for each downlink CC.

For CC bundling of multiple transport blocks received on multiple CCs, an ACK or a NACK may be determined for each transport block. A bundled ACK may be sent if ACKs are obtained for all transport blocks, and a bundled NACK may be sent if a NACK is obtained for any transport block. If one transport block is received on each CC, then CC bundling may be performed to obtain one bit of ACK/NACK information for all transport blocks received on the multiple CCs. If two transport blocks are received on each CC, then CC bundling may be performed on (i) the first transport blocks received on all CCs to obtain one bit of ACK/NACK information and (ii) the second transport blocks received on all CCs to obtain another bit of ACK/NACK information. With CC bundling, up to two bits of ACK/NACK information may be sent for data transmission of up to two transport blocks on each of multiple CCs.

In one particular example, if spatial bundling and/or CC bundling are performed, then one bit of ACK/NACK information may be sent based on PUCCH format 1a, and two bits of ACK/NACK information may be sent based on PUCCH format 1b. One or two bits of ACK/NACK information may be sent on a PUCCH resource, which may be determined based on the first CCE of the PDCCH carrying a downlink grant on the downlink PCC or PUCCH resources configured for a UE via higher layer signaling.

Figure 5:
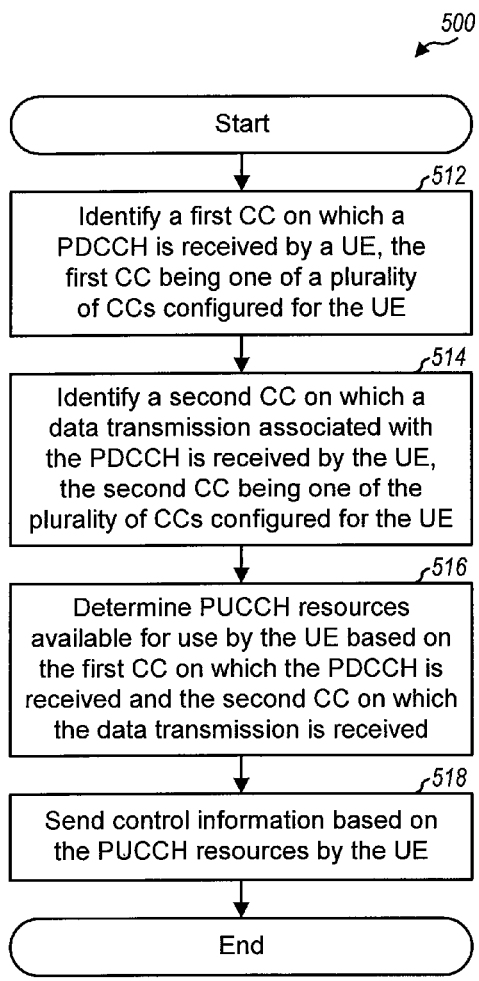
FIG. 5 shows an exemplary process for sending control information in a multi-carrier wireless communication system.

FIG. 5 shows an exemplary process 500 for determining PUCCH resources in a multi-carrier wireless communication system. Process 500 may be performed by a UE (as described below) or by some other entity. The UE may be configured to receive data transmissions on a plurality of component carriers. At block 512, the UE identifies a first CC on which a PDCCH is received. At block 514, the UE identifies a second CC on which a data transmission associated with the PDCCH is received, where the first and second CCs are among the set of CCs configured for use by the UE. At block 516, PUCCH resources available for use by the UE are determined based on the first CC on which the PDCCH is received and the second CC on which the data transmission is received. At block 518, the UE sends control information based on the determined PUCCH resources.

With the operations at block 516, the UE may determine a transmission mode of the second CC. The UE may then also determine the available PUCCH resources based, at least in part, on the transmission mode of the second CC. For example, the UE may determine a number of transport blocks K which are supported by the transmission mode of the second CC. K may be greater than or equal to one. The UE may then determine K PUCCH resources based on the first CC on which the PDCCH is received and the second CC on which the data transmission is received. The UE may thus determine how many PUCCH resources are available based on the transmission mode.

In one aspect, the PDCCH may be sent on a PCC for a data transmission on the PCC. In one example, for blocks 512-514, the first CC on which the PDCCH is received may be identified as a PCC for the UE, and the second CC on which the data transmission is received may also be identified as the PCC. The UE may determine the available PUCCH resources based on a number of a first CCE associated with (e.g., used to send) the PDCCH received on the PCC.

In another aspect, the PDCCH may be sent on a PCC for a data transmission on an SCC. In another example, the first CC on which the PDCCH is received may be identified as the PCC for the UE, and the second CC on which the data transmission is received may be identified as an SCC. The UE may determine the available PUCCH resources based on a number of a first CCE associated with the PDCCH received on the PCC.

In another aspect, the PDCCH may be sent on an SCC for a data transmission on the SCC. The first CC on which the PDCCH is received may be an SCC for the UE, and the second CC on which the data transmission is received may also be the SCC. The UE may determine the available PUCCH resources based on PUCCH resources configured for the UE via higher layer signaling.

In a further aspect, the PDCCH may be received on the PCC. The UE may determine that a transmission mode of the second CC supports one transport block. The UE may determine one PUCCH resource available for use by the UE based on the number of the first CCE associated with the PDCCH received on the PCC. In some examples, the UE may determine that a transmission mode of the second CC supports two transport blocks. The UE may then determine two consecutive PUCCH resources based on the number of the first CCE associated with the PDCCH received on the PCC. In general, for explicit linking, the UE may determine available PUCCH resources based on resources associated with (e.g., used to send) the PDCCH on the first CC.

In an aspect, two PDCCHs may be sent on the PCC for two data transmissions on the PCC and SCC (e.g., case 2 in Table 1). The UE may receive first and second PDCCHs on the first CC. The first PDCCH may comprise a first downlink grant for a first data transmission on the first CC. The second PDCCH may comprise a second downlink grant for a second data transmission on the second CC. The UE may determine a first set of available PUCCH resources based on the number of the first CCE of the first PDCCH. The UE may determine a second set of available PUCCH resources based on the number of the first CCE of the second PDCCH. In one example, the first set may include two consecutive PUCCH resources determined based on the number of the first CCE of the first PDCCH and the second set may include an additional two consecutive PUCCH resources which are determined based on the number of the first CCE of the second PDCCH. The first set and/or the second set may also include fewer or more PUCCH resources.

In some aspects, one PDCCH may be sent on the PCC for data transmission on the PCC, and another PDCCH may be sent on the SCC for data transmission on the SCC (e.g., case 3 in Table 1). The UE may receive a first PDCCH on the first CC, with the first PDCCH comprising a first downlink grant for a first data transmission on the first CC. The UE may receive a second PDCCH on the second CC, with the second PDCCH comprising a second downlink grant for a second data transmission on the second CC. The UE may determine a first set of available PUCCH resources based on the number of the first CCE of the first PDCCH and a second set of available PUCCH resources based on PUCCH resources configured for the UE via higher layer signaling.

In a further aspect, for dynamic scheduling, the UE may receive a downlink grant on the PDCCH on the first CC and may receive an associated data transmission on the second CC. The UE may determine ACK/NACK information for the received data transmission and may send the ACK/NACK information based on the available PUCCH resources. For semi-static scheduling, the UE may receive a message on the PDCCH for SPS of the data transmission received on the second CC. The message may activate, deactivate, or change SPS. The control information to be sent may comprise ACK/NACK information for the data transmission.

The UE may alternatively send the ACK/NACK information based on a predetermined PUCCH format (e.g., PUCCH format 1b) with channel selection, which may be configured for the UE. The UE may select one of the available PUCCH resources and may send signaling for the ACK/NACK information on the selected PUCCH resource. In one particular example, four PUCCH resources may be available for use by the UE, and the ACK/NACK information may comprise four bits. The UE may select one of the four PUCCH resources and may send signaling for the four bits of the ACK/NACK information on the selected PUCCH resource.

Figure 6:
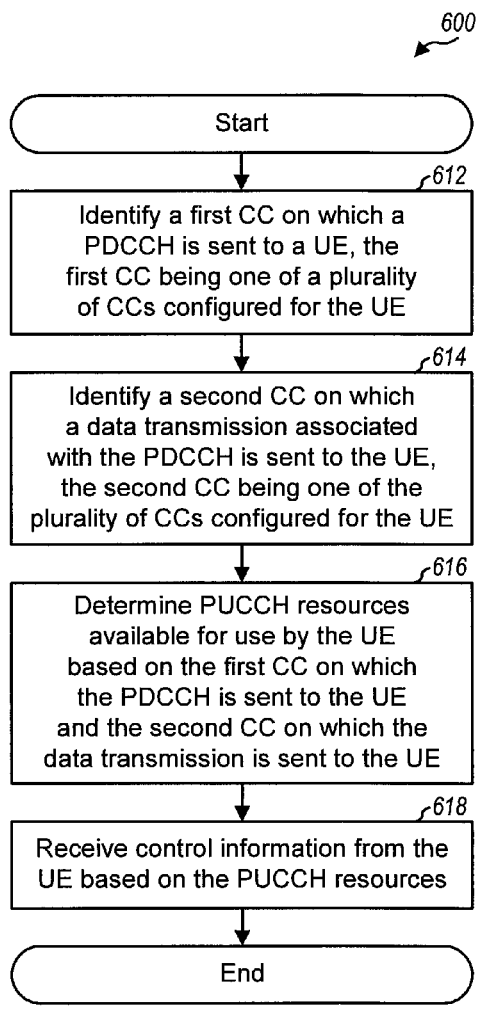
FIG. 6 shows an exemplary process for receiving control operation in a multi-carrier wireless communication system.

FIG. 6 shows an exemplary process 600 for receiving control information from a user equipment in a multi-carrier wireless communication system. Process 600 may be performed by a base station/eNB (as described below) or by some other entity. At block 612, the base station identifies a first CC on which a PDCCH is sent to a multi-carrier UE. At block 614, the base station also identifies a second CC on which a data transmission associated with the PDCCH is sent to the UE. The first and second CCs may be the same CC or different CCs and are among a plurality of CCs configured for use by the UE. At block 616, the base station determines PUCCH resources available for use by the UE based on the first CC on which the PDCCH is sent to the UE and the second CC on which the data transmission is sent to the UE. The base station, at block 618, receives control information from the UE based on the PUCCH resources.

The base station may determine a transmission mode of the second CC for the UE. At block 616, the base station may determine the PUCCH resources available for use by the UE based at least in part on the transmission mode of the second CC. For example, the base station may determine that K transport blocks are supported by the transmission mode of the second CC, where K may be one or greater. The base station may determine K PUCCH resources available for use by the UE based on the first CC on which the PDCCH is sent to the UE and the second CC on which the data transmission is sent to the UE.

In one aspect, the base station may send the PDCCH on a PCC for a data transmission also on the PCC. At blocks 612-614, the first CC on which the PDCCH is sent may be identified as the PCC for the UE, and the second CC on which the data transmission is sent may also be identified as the PCC. The base station may determine the PUCCH resources available for use by the UE based on a number of a first CCE associated with the PDCCH sent on the PCC.

In another aspect, the base station may send the PDCCH on a PCC for a data transmission on an SCC among the plurality of CCs configured for a particular UE. The first CC on which the PDCCH is sent may be the PCC for the UE, and the second CC on which the data transmission is sent may be an SCC for the UE. The base station may determine the PUCCH resources available for use by the UE based on a number of a first CCE associated with the PDCCH sent on the PCC.

In a further aspect, the base station may send the PDCCH on an SCC for a data transmission on the SCC. For example, the first CC on which the PDCCH is sent may be an SCC for the UE, and the second CC on which the data transmission is sent may also be the SCC. The base station may determine the PUCCH resources available for use by the UE based on PUCCH resources configured for the UE via higher layer signaling.

In one aspect, the base station may send the PDCCH on the PCC for the UE. The base station may determine that a transmission mode of the second CC supports one transport block. At block 616, the base station may determine one PUCCH resource available for use by the UE based on the number of the first CCE associated with the PDCCH received on the PCC. In another example, the base station may determine that a transmission mode of the second CC supports two transport blocks. In that case, at block 616, the base station may determine two consecutive PUCCH resources available for use by the UE based on the number of the first CCE associated with the PDCCH received on the PCC.

In yet another aspect, the base station may send two PDCCHs on the PCC for two data transmissions, one on the PCC and one on the SCC (e.g., case 2 in Table 1). The base station may send first and second PDCCHs on the first CC in which the first PDCCH comprises a first downlink grant for a first data transmission on the first CC and the second PDCCH comprises a second downlink grant for a second data transmission on the second CC. At block 616, the base station may determine a first set of PUCCH resources available for use by the UE based on the number of the first CCE of the first PDCCH and a second set of PUCCH resources based on the number of the first CCE of the second PDCCH.

In another aspect, the base station may send one PDCCH on the PCC for data transmission on the PCC, and another PDCCH on the SCC for data transmission on the SCC (e.g., case 3 in Table 1). The base station may send a first PDCCH on the first CC, with the first PDCCH comprising a first downlink grant for a first data transmission on the first CC. The base station may send a second PDCCH on the second CC, with the second PDCCH comprising a second downlink grant for a second data transmission on the second CC. The base station may determine, at block 616, a first set of PUCCH resources available for use by the UE based on the number of the first CCE of the first PDCCH and a second set of PUCCH resources based on PUCCH resources configured for the UE via higher layer signaling.

In one aspect, for dynamic scheduling, the base station may send a downlink grant on the PDCCH on the first CC and may send the data transmission on the second CC. Alternatively, for semi-static scheduling, the base station may send a message on the PDCCH for semi-persistent scheduling of the data transmission on the second CC. In both cases, the base station may receive ACK/NACK information for the data transmission based on the PUCCH resources available for use by the UE. In one example, the base station may receive signaling for the ACK/NACK information on one of the PUCCH resources available for use by the UE and may determine additional ACK/NACK information based on the PUCCH resource on which the signaling is received and the received signaling.

Figure 7:
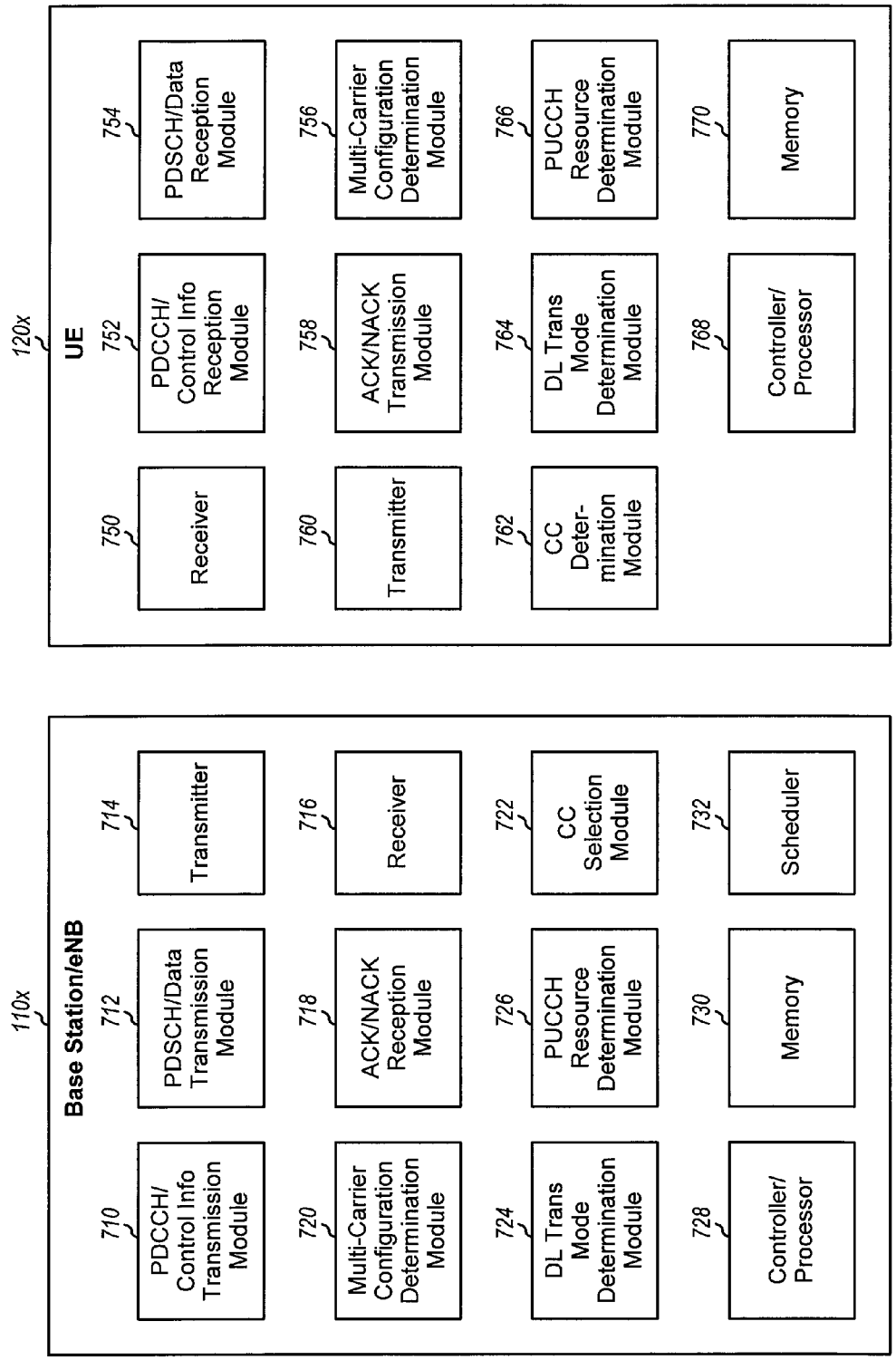
FIG. 7 is a block diagram showing aspects of a base station and UE according to the present disclosure.

FIG. 7 shows a block diagram of an exemplary base station/eNB 110x and UE 120x, which may be one of the base stations/eNBs and one of the UEs described in connection with FIG. 1. Exemplary base station 110x and exemplary UE 120x are shown as including a plurality of modules which may include processors, electronic devices, hardware devices, electronic components, logical circuits, memories, software codes, firmware codes, etc., or any combination thereof.

Base station 110x includes a module 710 configured to generate PDCCH transmissions which may include downlink grants and/or other DCI for one or more CCs (e.g., the downlink PCC and/or SCC). A module 712 is configured to generate PDSCH transmissions associated with the PDCCH transmissions. The PDSCH transmissions may include data and/or other information for one or more CCs (e.g., the downlink PCC and/or SCC). A transmitter 714 is configured to generate a downlink signal comprising the PDCCH and/or PDSCH transmissions. A receiver 716 is configured to receive and process uplink signals. A module 718 is configured to process the received signals and to recover ACK/NACK information sent by UE 120x and other UEs which are responsive to data transmissions sent on the PDSCH.

A module 720 is configured to determine the multi-carrier configuration of a UE 120x, e.g., to identify which CCs are configured for the downlink and uplink, and which CCs represent the downlink PCC and uplink PCC for the UE. A module 722 is configured to determine the CC(s) on which to send PDCCH transmissions and the CC(s) on which to send PDSCH transmissions. As previously discussed, the PDCCH and PDSCH may be sent on the same or different CCs. A module 724 is configured to determine the transmission mode of each CC on which a PDSCH transmission is sent which may correspond to a number of PUCCH resources available for acknowledging receipt of the PDSCH data transmissions.

A module 726 is configured to determine the PUCCH resources available for use by UE 120x based on the CC(s) on which PUCCH transmissions are sent, the CC(s) on which PDSCH transmissions are sent, the transmission mode of each scheduled CC, the PUCCH resources configured for UE 120x, etc. Module 718 is configured to receive ACK/NACK information from UE 120x based on the available PUCCH resources. The various modules within base station 110x may operate as described above. Further, a controller/processor 728 may direct the operation of various modules within base station 110x, a memory 730 may store data and program codes used by the processor 728, and a scheduler 732 may schedule UEs for data transmission.

As shown, UE 120x includes a receiver 750 which is configured to receive and process downlink signals from base station 110x. A module 752 is configured to process (e.g., demodulate and decode) the received signal and to recover PDCCH transmissions sent to UE 120x. A module 754 is configured to process the received signal to recover PDSCH transmissions corresponding to the PDCCH transmissions. A module 758 is configured to determine ACK/NACK information for the received data transmissions. Module 758 is also configured to send the ACK/NACK information on the PUCCH based on PUCCH resources available to UE 120x. A transmitter 760 is configured to transmit an uplink signal comprising the ACK/NACK information. The uplink signal may be a PUCCH transmission.

A module 756 is configured to determine the multi-carrier configuration of UE 120x, e.g., identify which CCs are configured for UE 120x for the downlink and uplink, and which CCs represent the downlink PCC and the uplink PCC, respectively. A module 762 is configured to determine the CC(s) on which to receive PDCCH transmissions and the CC(s) on which to receive PDSCH transmissions. A module 764 is configured to determine the transmission mode of each CC on which a PDSCH transmission is received. A module 766 is configured to determine the PUCCH resources available for use by the UE based on the CC(s) on which PUCCH transmissions are received, the CC(s) on which PDSCH transmissions are received, the transmission mode of each scheduled CC, the PUCCH resources configured for UE 120x, etc. The various modules within UE 120x may operate as described above. Further, a controller/processor 768 may direct the operation of various modules within UE 120x, and a memory 770 may store data and program codes used by the processor 770.

Figure 8:
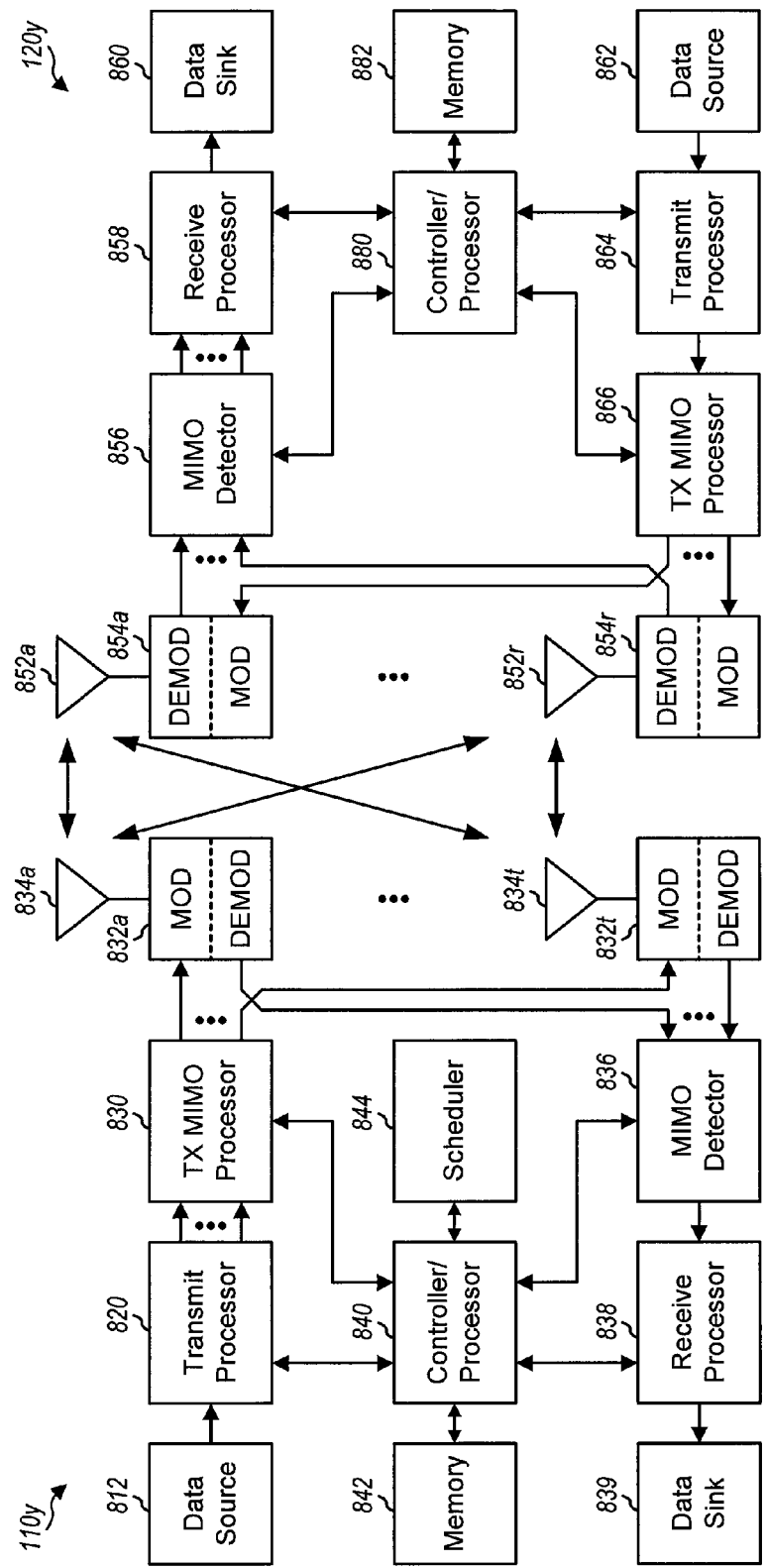
FIG. 8 is a block diagram showing further aspects of a base station and a UE according to the present disclosure.

FIG. 8 shows a block diagram of a design of a base station/eNB 110y and a UE 120y, which may be one of the base stations/eNBs and one of the UEs in FIG. 1. Base station 110y may be equipped with T antennas 834a through 834t, and UE 120y may be equipped with R antennas 852a through 852r where, in general, $T \geq 1$ and $R \geq 1$.

At base station 110y, a transmit processor 820 may receive data from a data source 812 for transmission on one or more downlink CCs to one or more UEs, process (e.g., encode and modulate) the data for each UE based on one or more modulation and coding schemes selected for that UE, and provide data symbols for all UEs. Transmit processor 820 may also process control information (e.g., for downlink grants, configuration messages, etc.) and provide control symbols. Processor 820 may also generate reference symbols for reference signals. A transmit (TX) MIMO processor 830 may precode the data symbols, the control symbols, and/or the reference symbols (if applicable) and may provide T output symbol streams to T modulators (MOD) 832a through 832t. Each modulator 832 may process its output symbol stream (e.g., for OFDM, etc.) to obtain an output sample stream. Each modulator 832 may further condition (e.g., convert to analog, amplify, filter, and upconvert) its output sample stream to obtain a downlink signal. T downlink signals from modulators 832a through 832t may be transmitted via T antennas 834a through 834t, respectively.

At UE 120y, antennas 852a through 852r may receive the downlink signals from base station 110y and/or other base stations and may provide received signals to demodulators (DEMODs) 854a through 854r, respectively. Each demodulator 854 may condition (e.g., filter, amplify, downconvert, and digitize) its received signal to obtain input samples. Each demodulator 854 may further process the input samples (e.g., for OFDM, etc.) to obtain received symbols. A MIMO detector 856 may obtain received symbols from all R demodulators 854a through 854r, perform MIMO detection on the received symbols, and provide detected symbols. A receive processor 858 may process (e.g., demodulate and decode) the detected symbols, provide decoded data for UE 120y to a data sink 860, and provide decoded control information to a controller/processor 880.

On the uplink, at UE 120y, a transmit processor 864 may receive and process data from a data source 862 and control information (e.g., ACK/NACK information, etc.) from controller/processor 880. Processor 864 may also generate reference symbols for one or more reference signals. The symbols from transmit processor 864 may be precoded by a TX MIMO processor 866 if applicable, further processed by modulators 854a through 854r (e.g., for SC-FDM, OFDM, etc.), and transmitted to base station 110y. At base station 110y, the uplink signals from UE 120y and other UEs may be received by antennas 834, processed by demodulators 832, detected by a MIMO detector 836 if applicable, and further processed by a receive processor 838 to obtain decoded data and control information sent by UE 120y and other UEs. Processor 838 may provide the decoded data to a data sink 839 and the decoded control information to controller/processor 840.

Controllers/processors 840 and 880 may direct the operation at base station 110y and UE 120y, respectively. Processor 840 and/or other processors and modules at base station 110y may perform or direct process 600 in FIG. 6 and/or other processes for the techniques described herein. Processor 880 and/or other processors and modules at UE 120y may perform or direct process 500 in FIG. 5 and/or other processes for the techniques described herein. Memories 842 and 882 may store data and program codes for base station 110y and UE 120y, respectively. A scheduler 844 may schedule UEs for data transmission on the downlink and/or uplink.

It will be appreciated that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or, as a combination of hardware and software elements, depends upon the particular application.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   identifying a first component carrier (CC) on which a physical downlink control channel (PDCCH) is received by a user equipment (UE), the first CC being one of a plurality of CCs configured for the UE;
   identifying a second CC on which a data transmission associated with the PDCCH is received by the UE, the second CC being one of the plurality of CCs configured for the UE, wherein the data transmission comprises one or more transport blocks;
   determining a transmission mode of the second CC;
   determining that K transport blocks are supported by the transmission mode of the second CC, where K is one or greater;
   determining K physical uplink control channel (PUCCH) resources based on the first CC on which the PDCCH is received and the second CC on which the data transmission is received; and
   sending, by the UE, acknowledgement/negative acknowledgement (ACK/NACK) information for the data transmission based on the PUCCH resources.

2. The method of claim 1, further comprising:
   determining a transmission mode of the second CC; and
   determining the PUCCH resources based further on the transmission mode of the second CC.

3. The method of claim 1, wherein,
   identifying the first CC on which the PDCCH is received further comprises identifying the first CC as a primary CC (PCC) for the UE, identifying the second CC on which the data transmission is received further comprises identifying the second CC as the PCC, and
determining the PUCCH resources comprises determining the PUCCH resources based on a number of a first control channel element (CCE) associated with the PDCCH received on the PCC.

4. The method of claim 1, wherein:
identifying the first CC on which the PDCCH is received further comprises identifying the first CC as a primary CC (PCC) for the UE,
identifying the second CC on which the data transmission is further received comprises identifying the second CC as a secondary CC (SCC) for the UE, and
determining the PUCCH resources comprises determining the PUCCH resources based on a number of a first control channel element (CCE) associated with the PDCCH received on the PCC.

5. The method of claim 1, wherein:
identifying the first CC on which the PDCCH is received further comprises identifying the first CC as a secondary CC (SCC) for the UE,
identifying the second CC on which the data transmission is received further comprises identifying the second CC as the SCC, and
determining the PUCCH resources comprises determining the PUCCH resources based on PUCCH resources configured for the UE via higher layer signaling.

6. The method of claim 1, wherein
identifying the first CC on which the PDCCH is received further comprises identifying the first CC as a primary CC (PCC) for the UE, and
determining the PUCCH resources further comprises:
determining that a transmission mode of the second CC supports one transport block, and
determining one PUCCH resource based on a number of a first control channel element (CCE) associated with the PDCCH received on the PCC.

7. The method of claim 1, wherein
identifying the first CC on which the PDCCH is received further comprises identifying the first CC as a primary CC (PCC) for the UE, and
determining the PUCCH resources further comprises:
determining that a transmission mode of the second CC supports two transport blocks, and
determining two consecutive PUCCH resources based on a number of a first control channel element (CCE) associated with the PDCCH received on the PCC.

8. The method of claim 1, wherein determining the PUCCH resources comprises determining the PUCCH resources based on resources used to send the PDCCH on the first CC.

9. The method of claim 1, further comprising:
receiving first and second PDCCHs on the first CC, the first PDCCH comprising a first downlink grant for a first data transmission on the first CC, and the second PDCCH comprising a second downlink grant for a second data transmission on the second CC;
determining a first set of PUCCH resources based on a number of a first control channel element (CCE) of the first PDCCH; and
determining a second set of PUCCH resources based on a number of a first CCE of the second PDCCH.

10. The method of claim 9, wherein the first set includes two consecutive PUCCH resources determined based on the number of the first CCE of the first PDCCH, and the second set of PUCCH resources includes two consecutive PUCCH resources determined based on the number of the first CCE of the second PDCCH.

11. The method of claim 1, further comprising:
receiving a first PDCCH on the first CC, the first PDCCH comprising a first downlink grant for a first data transmission on the first CC;
receiving a second PDCCH on the second CC, the second PDCCH comprising a second downlink grant for a second data transmission on the second CC;
determining a first set of PUCCH resources available for use by the UE based on a number of a first control channel element (CCE) of the first PDCCH; and
determining a second set of PUCCH resources available for use by the UE based on PUCCH resources configured for the UE via higher layer signaling.

12. The method of claim 1, further comprising receiving a downlink grant on the PDCCH for the data transmission received on the second CC.

13. The method of claim 1, further comprising:
receiving a message on the PDCCH for semi-persistent scheduling (SPS) of the data transmission received on the second CC.

14. The method of claim 1, further comprising:
receiving the data transmission on the second CC; and
determining acknowledgement/negative acknowledgement (ACK/NACK) information for the received data transmission.

15. The method of claim 14, wherein the sending the ACK/NACK information comprises sending the ACK/NACK information based on a predetermined PUCCH format with channel selection.

16. The method of claim 14, wherein sending the ACK/NACK information comprises:
selecting one of the PUCCH resources from the determined PUCCH resources; and
sending signaling for the ACK/NACK information on the selected PUCCH resource.

17. The method of claim 14, wherein determining the PUCCH resources comprises determining four PUCCH resources and the ACK/NACK information comprises four bits, and
wherein sending the ACK/NACK information comprises:
selecting one of the four PUCCH resources, and
sending signaling for the four bits of the ACK/NACK information on the selected PUCCH resource.

18. An apparatus for wireless communication, comprising:
means for identifying a first component carrier (CC) on which a physical downlink control channel (PDCCH) is received by a user equipment (UE), the first CC being one of a plurality of CCs configured for the UE;
means for identifying a second CC on which a data transmission associated with the PDCCH is received by the UE, the second CC being one of the plurality of CCs configured for the UE, wherein the data transmission comprises one or more transport blocks;
means for determining a transmission mode of the second CC;
means for determining that K transport blocks are supported by the transmission mode of the second CC, where K is one or greater;
means for determining K physical uplink control channel (PUCCH) resources based on the first CC on which the PDCCH is received and the second CC on which the data transmission is received; and means for sending acknowledgement/negative acknowledgement (ACK/NACK) information for the data transmission based on the PUCCH resources.

19. The apparatus of claim 18, further comprising:
means for determining a transmission mode of the second CC; and
means for determining the PUCCH resources based further on the transmission mode of the second CC.

20. The apparatus of claim 18, wherein:
the means for identifying the first CC on which the PDCCH is received comprise means for identifying the first CC as a primary CC (PCC) for the UE,
the means for identifying the second CC on which the data transmission is received comprise means for identifying the second CC as the PCC or a secondary CC (SCC) for the UE, and
the means for determining the PUCCH resources comprise means for determining the PUCCH resources based on a number of a first control channel element (CCE) associated with the PDCCH received on the PCC.

21. The apparatus of claim 18, wherein:
the means for identifying the first CC on which the PDCCH is received comprise means for identifying the first CC as a secondary CC (SCC) for the UE,
the means for identifying the second CC on which the data transmission is received comprise means for identifying the second CC as the SCC, and
the means for determining the PUCCH resources comprise means for determining the PUCCH resources based on PUCCH resources configured for the UE via higher layer signaling.

22. The apparatus of claim 18, further comprising:
means for receiving first and second PDCCHs on the first CC, the first PDCCH comprising a first downlink grant for a first data transmission on the first CC, and the second PDCCH comprising a second downlink grant for a second data transmission on the second CC;
means for determining a first set of PUCCH resources based on a number of a first control channel element (CCE) of the first PDCCH; and
means for determining a second set of PUCCH resources based on a number of a first CCE of the second PDCCH.

23. The apparatus of claim 18, further comprising:
means for receiving a first PDCCH on the first CC, the first PDCCH comprising a first downlink grant for a first data transmission on the first CC;
means for receiving a second PDCCH on the second CC, the second PDCCH comprising a second downlink grant for a second data transmission on the second CC;
means for determining a first set of PUCCH resources available for use by the UE based on a number of a first control channel element (CCE) of the first PDCCH; and
means for determining a second set of PUCCH resources available for use by the UE based on PUCCH resources configured for the UE via higher layer signaling.

24. An apparatus for wireless communication, comprising:
at least one processor configured to:
identify a first component carrier (CC) on which a physical downlink control channel (PDCCH) is received by a user equipment (UE), the first CC being one of a plurality of CCs configured for the UE;
identify a second CC on which a data transmission associated with the PDCCH is received by the UE, the second CC being one of the plurality of CCs configured for the UE, wherein the data transmission comprises one or more transport blocks;
determine a transmission mode of the second CC;
determine that K transport blocks are supported by the transmission mode of the second CC, where K is one or greater;
determine K physical uplink control channel (PUCCH) resources based on the first CC on which the PDCCH is received and the second CC on which the data transmission is received; and
send, by the UE, acknowledgement/negative acknowledgement (ACK/NACK) information for the data transmission based on the PUCCH resources; and
a memory coupled to the at least one processor.

25. The apparatus of claim 24, wherein the at least one processor is configured to:
determine a transmission mode of the second CC, and
determine the PUCCH resources based further on the transmission mode of the second CC.

26. The apparatus of claim 24, wherein the at least one processor is configured to:
identify the first CC on which the PDCCH is received as a primary CC (PCC) for the UE,
identify the second CC on which the data transmission is received as the PCC or a secondary CC (SCC) for the UE, and
determine the PUCCH resources available based on a number of a first control channel element (CCE) associated with the PDCCH received on the PCC.

27. The apparatus of claim 24, wherein the at least one processor is configured to:
identify the first CC on which the PDCCH is received as a secondary CC (SCC) for the UE,
identify the second CC on which the data transmission is received as the SCC, and
determine the PUCCH resources based on PUCCH resources configured for the UE via higher layer signaling.

28. The apparatus of claim 24, wherein the at least one processor is configured to:
receive first and second PDCCHs on the first CC, the first PDCCH comprising a first downlink grant for a first data transmission on the first CC, and the second PDCCH comprising a second downlink grant for a second data transmission on the second CC,
determine a first set of PUCCH resources based on a number of a first control channel element (CCE) of the first PDCCH, and
determine a second set of PUCCH resources based on a number of a first CCE of the second PDCCH.

29. The apparatus of claim 24, wherein the at least one processor is configured to:
receive a first PDCCH on the first CC, the first PDCCH comprising a first downlink grant for a first data transmission on the first CC, to receive a second PDCCH on the second CC, the second PDCCH comprising a second downlink grant for a second data transmission on the second CC,
determine a first set of PUCCH resources based on a number of a first control channel element (CCE) of the first PDCCH, and
determine a second set of PUCCH resources based on PUCCH resources configured for the UE via higher layer signaling.

30. A computer program product, comprising:
a non-transitory computer-readable medium comprising:
code for causing at least one processor to identify a first component carrier (CC) on which a physical downlink control channel (PDCCH) is received by a user equipment (UE), the first CC being one of a plurality of CCs configured for the UE;

code for causing the at least one processor to identify a second CC on which a data transmission associated with the PDCCH is received by the UE, the second CC being one of the plurality of CCs configured for the UE;

code for causing the at least one processor to determine a transmission mode of the second CC;

code for causing the at least one processor to determine that K transport blocks are supported by the transmission mode of the second CC, where K is one or greater;

code for causing the at least one processor to determine K physical uplink control channel (PUCCH) resources based on the first CC on which the PDCCH is received and the second CC on which the data transmission is received, wherein the data transmission comprises one or more transport blocks; and code for causing the at least one processor to send, by the UE, acknowledgement/negative acknowledgement (ACK/NACK) information for the data transmission based on the PUCCH resources.

31. A method for wireless communication, comprising:
identifying a first component carrier (CC) on which a physical downlink control channel (PDCCH) is sent to a user equipment (UE), the first CC being one of a plurality of CCs configured for the UE;
identifying a second CC on which a data transmission associated with the PDCCH is sent to the UE, the second CC being one of the plurality of CCs configured for the UE, wherein the data transmission comprises one or more transport blocks;
determining a transmission mode of the second CC;
determining that K transport blocks are supported by the transmission mode of the second CC, where K is one or greater;
determining K physical uplink control channel (PUCCH) resources available for use by the UE based on the first CC on which the PDCCH is sent to the UE and the second CC on which the data transmission is sent to the UE; and
receiving, from the UE, acknowledgement/negative acknowledgement (ACK/NACK) information for the data transmission based on the PUCCH resources.

32. The method of claim 31, further comprising:
determining a transmission mode of the second CC; and
determining the PUCCH resources available for use by the UE based further on the transmission mode of the second CC.

33. The method of claim 31, wherein:
identifying the first CC on which the PDCCH is sent further comprises identifying the first CC as a primary CC (PCC) for the UE,
identifying the second CC on which the data transmission is sent further comprises identifying the second CC as the PCC, and
determining the PUCCH resources comprises determining the PUCCH resources available for use by the UE based on a number of a first control channel element (CCE) associated with the PDCCH sent on the PCC.

34. The method of claim 31, wherein:
identifying the first CC on which the PDCCH is sent further comprises identifying the first CC as a primary CC (PCC) for the UE, identifying the second CC on which the data transmission is sent further comprises identifying the second CC as a secondary CC (SCC) for the UE, and
determining the PUCCH resources comprises determining the PUCCH resources available for use by the UE based on a number of a first control channel element (CCE) associated with the PDCCH sent on the PCC.

35. The method of claim 31, wherein:
identifying the first CC on which the PDCCH is sent further comprises identifying the first CC as a secondary CC (SCC) for the UE,
identifying the second CC on which the data transmission is sent further comprises identifying the second CC as the SCC, and
determining the PUCCH resources comprises determining the PUCCH resources available for use by the UE based on PUCCH resources configured for the UE via higher layer signaling.

36. The method of claim 31, wherein the first CC on which the PDCCH is sent is a primary CC (PCC) for the UE, and
wherein the determining the PUCCH resources comprises:
determining that a transmission mode of the second CC supports one transport block, and
determining one PUCCH resource available for use by the UE based on a number of a first control channel element (CCE) associated with the PDCCH sent on the PCC.

37. The method of claim 31, wherein the first CC on which the PDCCH is sent is a primary CC (PCC) for the UE, and
wherein the determining the PUCCH resources comprises:
determining that a transmission mode of the second CC supports two transport blocks, and
determining two consecutive PUCCH resources available for use by the UE based on a number of a first control channel element (CCE) associated with the PDCCH sent on the PCC.

38. The method of claim 31, further comprising:
sending first and second PDCCHs on the first CC, the first PDCCH comprising a first downlink grant for a first data transmission on the first CC, and the second PDCCH comprising a second downlink grant for a second data transmission on the second CC;
determining a first set of PUCCH resources available for use by the UE based on a number of a first control channel element (CCE) of the first PDCCH; and
determining a second set of PUCCH resources available for use by the UE based on a number of a first CCE of the second PDCCH.

39. The method of claim 31, further comprising:
sending a first PDCCH on the first CC, the first PDCCH comprising a first downlink grant for a first data transmission on the first CC;
sending a second PDCCH on the second CC, the second PDCCH comprising a second downlink grant for a second data transmission on the second CC;
determining a first set of PUCCH resources available for use by the UE based on a number of a first control channel element (CCE) of the first PDCCH; and
determining a second set of PUCCH resources available for use by the UE based on PUCCH resources configured for the UE via higher layer signaling.

40. The method of claim 31, further comprising sending a downlink grant on the PDCCH for the data transmission sent on the second CC.

41. The method of claim 31, further comprising sending a message on the PDCCH for semi-persistent scheduling (SPS) of the data transmission sent on the second CC.

42. The method of claim 31, wherein receiving the ACK/NACK information comprises:
  receiving signaling for the ACK/NACK information on one of the PUCCH resources available for use by the UE, and
  determining the ACK/NACK information based on the PUCCH resource on which the signaling is received and the received signaling.

43. An apparatus for wireless communication, comprising:
  means for identifying a first component carrier (CC) on which a physical downlink control channel (PDCCH) is sent to a user equipment (UE), the first CC being one of a plurality of CCs configured for the UE;
  means for identifying a second CC on which a data transmission associated with the PDCCH is sent to the UE, the second CC being one of the plurality of CCs configured for the UE, wherein the data transmission comprises one or more transport blocks;
  means for determining a transmission mode of the second CC;
  means for determining that K transport blocks are supported by the transmission mode of the second CC, where K is one or greater;
  means for determining K physical uplink control channel (PUCCH) resources available for use by the UE based on the first CC on which the PDCCH is sent to the UE and the second CC on which the data transmission is sent to the UE; and
  means for receiving, from the UE, acknowledgement/negative acknowledgement (ACK/NACK) information for the data transmission based on the PUCCH resources.

44. The apparatus of claim 43, further comprising:
  means for determining a transmission mode of the second CC; and
  means for determining the PUCCH resources available for use by the UE based further on the transmission mode of the second CC.

45. The apparatus of claim 43, wherein:
  the means for identifying the first CC on which the PDCCH is sent comprise means for identifying the first CC as a primary CC (PCC) for the UE,
  the means for identifying second CC on which the data transmission is sent comprise means for identifying the second CC as the PCC or a secondary CC (SCC) for the UE, and
  the means for determining the PUCCH resources comprise means for determining the PUCCH resources available for use by the UE based on a number of a first control channel element (CCE) associated with the PDCCH sent on the PCC.

46. The apparatus of claim 43, wherein:
  the means for identifying the first CC on which the PDCCH is sent comprise means for identifying the first CC as a secondary CC (SCC) for the UE,
  the means for identifying the second CC on which the data transmission is sent comprise means for identifying the second CC as the SCC, and
  the means for determining the PUCCH resources comprises means for determining the PUCCH resources available for use by the UE based on PUCCH resources configured for the UE via higher layer signaling.

47. The apparatus of claim 43, further comprising:
  means for sending first and second PDCCHs on the first CC, the first PDCCH comprising a first downlink grant for a first data transmission on the first CC, and the second PDCCH comprising a second downlink grant for a second data transmission on the second CC;
  means for determining a first set of PUCCH resources available for use by the UE based on a number of a first control channel element (CCE) of the first PDCCH; and
  means for determining a second set of PUCCH resources available for use by the UE based on a number of a first CCE of the second PDCCH.

48. The apparatus of claim 43, further comprising:
  means for sending a first PDCCH on the first CC, the first PDCCH comprising a first downlink grant for a first data transmission on the first CC;
  means for sending a second PDCCH on the second CC, the second PDCCH comprising a second downlink grant for a second data transmission on the second CC;
  means for determining a first set of PUCCH resources available for use by the UE based on a number of a first control channel element (CCE) of the first PDCCH; and
  means for determining a second set of PUCCH resources available for use by the UE based on PUCCH resources configured for the UE via higher layer signaling.

49. An apparatus for wireless communication, comprising:
  at least one processor configured to:
    identify a first component carrier (CC) on which a physical downlink control channel (PDCCH) is sent to a user equipment (UE), the first CC being one of a plurality of CCs configured for the UE;
    identify a second CC on which a data transmission associated with the PDCCH is sent to the UE, the second CC being one of the plurality of CCs configured for the UE, wherein the data transmission comprises one or more transport blocks;
    determine a transmission mode of the second CC;
    determine that K transport blocks are supported by the transmission mode of the second CC, where K is one or greater;
    determine K physical uplink control channel (PUCCH) resources available for use by the UE based on the first CC on which the PDCCH is sent to the UE and the second CC on which the data transmission is sent to the UE; and
    receive acknowledgement/negative acknowledgement (ACK/NACK) information for the data transmission based on the PUCCH resources; and
  a memory coupled to the at least one processor.

50. The apparatus of claim 49, wherein the at least one processor is configured to:
  determine a transmission mode of the second CC, and
  determine the PUCCH resources available for use by the UE based further on the transmission mode of the second CC.

51. The apparatus of claim 49, wherein the at least one processor is configured to:
  identify first CC on which the PDCCH is sent as a primary CC (PCC) for the UE,
  identify the second CC on which the data transmission is sent as the PCC or a secondary CC (SCC) for the UE, and
  determine the PUCCH resources available for use by the UE based on a number of a first control channel element (CCE) associated with the PDCCH sent on the PCC.

52. The apparatus of claim 49, wherein the at least one processor is configured to:
  identify first CC on which the PDCCH is sent as a secondary CC (SCC) for the UE,
  identify the second CC on which the data transmission is sent as the SCC, and determine the PUCCH resources available for use by the UE based on PUCCH resources configured for the UE via higher layer signaling.

53. The apparatus of claim 49, wherein the at least one processor is configured to:
send first and second PDCCHs on the first CC, the first PDCCH comprising a first downlink grant for a first data transmission on the first CC, and the second PDCCH comprising a second downlink grant for a second data transmission on the second CC,
determine a first set of PUCCH resources available for use by the UE based on a number of a first control channel element (CCE) of the first PDCCH, and
determine a second set of PUCCH resources available for use by the UE based on a number of a first CCE of the second PDCCH.

54. The apparatus of claim 49, wherein the at least one processor is configured to:
send a first PDCCH on the first CC, the first PDCCH comprising a first downlink grant for a first data transmission on the first CC,
send a second PDCCH on the second CC, the second PDCCH comprising a second downlink grant for a second data transmission on the second CC,
determine a first set of PUCCH resources available for use by the UE based on a number of a first control channel element (CCE) of the first PDCCH, and
determine a second set of PUCCH resources available for use by the UE based on PUCCH resources configured for the UE via higher layer signaling.

55. A computer program product, comprising:
a non-transitory computer-readable medium comprising:
code for causing at least one processor to identify a first component carrier (CC) on which a physical downlink control channel (PDCCH) is sent to a user equipment (UE), the first CC being one of a plurality of CCs configured for the UE;
code for causing the at least one processor to identify a second CC on which a data transmission associated with the PDCCH is sent to the UE, the second CC being one of the plurality of CCs configured for the UE, wherein the data transmission comprises one or more transport blocks;
code for causing the at least one processor to determine a transmission mode of the second CC;
code for causing the at least one processor to determine that K transport blocks are supported by the transmission mode of the second CC, where K is one or greater;
code for causing the at least one processor to determine K physical uplink control channel (PUCCH) resources available for use by the UE based on the first CC on which the PDCCH is sent to the UE and the second CC on which the data transmission is sent to the UE; and
code for causing the at least one processor to receive acknowledgement/negative acknowledgement (ACK/NACK) information for the data transmission based on the PUCCH resources.

* * * * *